US010842181B2

(12) United States Patent
Sigal et al.

(10) Patent No.: US 10,842,181 B2
(45) Date of Patent: Nov. 24, 2020

(54) STUFFED, FLAVORED AND PACKAGED OLIVES

(71) Applicant: Musco Olive Products, Inc., Tracy, CA (US)

(72) Inventors: Abdulkadir Yussuf Sigal, Manteca, CA (US); Jesus Lopez Garcia, Stockton, CA (US); Maria Valeria Theall, Tracy, CA (US)

(73) Assignee: Musco Olive Products, Inc., Tracy, CA (US)

( * ) Notice: Subject to any disclaimer, the term of this patent is extended or adjusted under 35 U.S.C. 154(b) by 0 days.

(21) Appl. No.: 13/885,151

(22) PCT Filed: Apr. 26, 2013

(86) PCT No.: PCT/US2013/038529
§ 371 (c)(1),
(2) Date: May 13, 2013

(87) PCT Pub. No.: WO2013/163621
PCT Pub. Date: Oct. 31, 2013

(65) Prior Publication Data
US 2014/0295050 A1    Oct. 2, 2014

Related U.S. Application Data

(60) Provisional application No. 61/639,731, filed on Apr. 27, 2012.

(51) Int. Cl.
*A23P 20/25*    (2016.01)
*A23B 7/148*    (2006.01)
(Continued)

(52) U.S. Cl.
CPC .............. *A23P 20/25* (2016.08); *A23B 7/005* (2013.01); *A23B 7/148* (2013.01); *A23B 7/16* (2013.01);
(Continued)

(58) Field of Classification Search
CPC ............ A23V 2002/00; A23V 2250/21; A23V 2200/10; A23V 2250/2131; A23V 2200/048; A23L 1/2123; A23L 1/212
(Continued)

(56) References Cited

U.S. PATENT DOCUMENTS 1,625,494 A    4/1927    Olivarius
2,436,463 A    2/1948    Dellen et al.
(Continued)

FOREIGN PATENT DOCUMENTS

DE    1035445 A1    6/2004
ES    2304090        12/1942
(Continued)

OTHER PUBLICATIONS

Dobson, Stuffed olives may hold key to beating heartburn misery, Daily Mail.com Oct. 24, 2011.*
(Continued)

*Primary Examiner* — Erik Kashnikow
*Assistant Examiner* — Lela S. Williams
(74) *Attorney, Agent, or Firm* — Dergosits & Noah LLP

(57) ABSTRACT

The invention relates to olive processing, and includes methods for producing olives, as well as the olives produced thereby. In one aspect, the invention provides compositions directed towards packaged olive preparations having novel and beneficial characteristics, for example, olive preparations that are free of packing liquids such as brine solutions. In other aspects, the packaged olive preparations of the invention can have other beneficial properties, such as
(Continued)

extended shelf life and flavored stuffings or flavor infusions. In other aspects, the invention provides methods for producing such olives. The invention relates particularly, but not exclusively, to black-ripe olives.

14 Claims, 8 Drawing Sheets

(51) Int. Cl.
*A23N 4/08* (2006.01)
*A23B 7/16* (2006.01)
*A23B 7/005* (2006.01)
*A23L 19/00* (2016.01)

(52) U.S. Cl.
CPC .............. *A23L 19/05* (2016.08); *A23N 4/085* (2013.01); *A23V 2002/00* (2013.01)

(58) Field of Classification Search
USPC ... 426/324, 615, 326, 325, 268, 270, 49, 52, 426/507, 508, 106, 108
See application file for complete search history.

(56) References Cited

U.S. PATENT DOCUMENTS

| | | | |
|---|---|---|---|
| 3,002,839 A | 10/1961 | Levinson | |
| 3,480,448 A | 11/1969 | Etchells et al. | |
| 3,831,389 A | 8/1974 | Lipona | |
| 4,006,256 A | 2/1977 | Kyros | |
| 4,090,439 A | 5/1978 | Chall et al. | |
| 4,141,287 A | 2/1979 | Becker et al. | |
| 4,168,325 A | 9/1979 | Gonzalez et al. | |
| 4,290,350 A | 9/1981 | Del ser Gonzalez | |
| 4,296,140 A | 10/1981 | Jaquith et al. | |
| 4,463,023 A | 7/1984 | McCorkle et al. | |
| 4,663,174 A | 5/1987 | Ollero Pina et al. | |
| 4,664,926 A | 5/1987 | Scrimshire | |
| 4,741,911 A | 5/1988 | McIntyre et al. | |
| 4,781,557 A | 11/1988 | Rubio et al. | |
| 4,789,553 A | 12/1988 | McIntyre et al. | |
| 4,931,297 A * | 6/1990 | Malyniak et al. | 426/265 |
| 5,094,871 A | 3/1992 | Heath | |
| 5,100,681 A | 3/1992 | Rodreguez | |
| 5,151,286 A | 9/1992 | Adams et al. | |
| 5,171,586 A | 12/1992 | Heath | |
| 5,183,706 A | 2/1993 | Bekele | |
| 5,192,565 A | 3/1993 | Buhler et al. | |
| 5,759,653 A | 6/1998 | Collette et al. | |
| 5,789,012 A | 8/1998 | Slimak | |
| 5,837,304 A | 11/1998 | Jepson et al. | |
| 6,599,639 B2 | 7/2003 | Dayrit et al. | |
| 6,635,290 B1 | 10/2003 | Boyer, Jr. et al. | |
| 6,703,059 B2 | 3/2004 | Sigal et al. | |
| 2003/0198717 A1 | 10/2003 | Sigal et al. | |
| 2004/0156960 A1 | 8/2004 | Villota et al. | |
| 2005/0191391 A1 | 9/2005 | Postma et al. | |
| 2006/0210740 A1 | 9/2006 | Bekele | |
| 2008/0061065 A1 | 3/2008 | Aronson et al. | |
| 2010/0136168 A1 | 6/2010 | McHaney et al. | |
| 2011/0256277 A1 | 10/2011 | Bows et al. | |
| 2013/0209623 A1 | 8/2013 | Beaumont | |

FOREIGN PATENT DOCUMENTS

| | | |
|---|---|---|
| ES | 2021972 | 11/1991 |
| WO | 199217075 A1 | 10/1992 |
| WO | 2003088769 | 10/2003 |
| WO | WO2006101965 A2 | 9/2006 |
| WO | 2011128553 A1 | 10/2011 |
| WO | 2012020269 A1 | 2/2012 |
| WO | 2013163621 | 10/2013 |

OTHER PUBLICATIONS

"Notification of Transmittal of the International Search Report and the Written Opinion of the International Serching Authority, or the Declaration", dated Sep. 17, 2013, PCT/US2013/038529, filed Apr. 26, 2013.
"Oloves Tasty Mediterranean Flavor, 48×1.1oz, Pitted Green Olives with Basil and Garlic," packaged green olives; sold by amazon.com, Inc., retrieved from <www.amazon.com>, first accessed on Mar. 13, 2012, item model No. OLOTM48; Amazon Standard Identification No. (ASIN) B0058DAOH2; earliest date of availability unknown.
"Oloves Original Natural Black Olives, 1.6 ounces Pouch (Pack of 6)" sold by amazon.com, Inc., retrieved from <www.amazon.com>, accessed on Jul. 12, 2013, item model No. OLOTM48; Amazon Standard Identification No. (ASIN) B001XVW4YU; UPC No. 640134350000; earliest date of availability unknown.
"Oloves—The Dieline" Blog, featuring "Oloves The Original: Pitted Natural Cuquillo Olives from Spain; the liquid-free healthy snack," dated Oct. 28, 2008, retrieved from: <http://www.thedieline.com/blog/2008/10/28/oloves.html>, accessed on Jul. 12, 2013.
"Oloves—Tasty Mediterranean" retrieved from www.fitnosh.com, accessed on Mar. 26, 2013. One page.
"Oloves Tasty Mediterranean" and "Oloves Light-Hearted Vinagrette," featured on <www.fitnosh.com>, dated Jul. 3, 2011, retrieved from <http://web.archive.org/> Internet Archive waybackmachine, accessed on Jul. 20, 2013.
"Jokey: Mini tapas in innovative packaging—oxygen remains outside!," retrieved from: http://www.jokey.com/us/aktuell/news/news-details/artikel/mini-tapas-in-innovativer-verpackung-sauerstoff-bleibt-draussen/. Accessed Dec. 27, 2011. One page.
Sabatini, "Recent Patents Concerning Organoleptic and Healthy Properties of Table Olives," Recent Patents on Chemical Engineering, vol. 2, p. 37-42 (2009).
"Processing California Olives" by Luh, Ferguson, Kader and Barrett in Olive Production Manual, Sibbett and Ferguson (eds.), University of California Division of Agriculture and Natural Resources, Publication 3353, Ch. 22, pp. 145-155 (2004).
"Purac Food ingredients—Food solutions overview," with product data sheets for PURAMEX® FE and PURAMEX® FE/HQ, retrieved from: http://www.purac.com/EN/Food/ingredients/Fruits_and_vegetables/Preservation/Shelf_life_extension/Color_stability.aspx, accessed on Oct. 23, 2011. Four pages.
"Processing Olives: Production and Harvesting," retrieved from: http://www.proper-spanish-tapas.com/processing-olives.html, accessed on Oct. 23, 2011.
"Ferrous Lactate / Iron Lactate" information sheet, retrieved from: http://www.ingredientswizard.com/ingredients/240-ferro-lactate-iron-lactate, accessed on Oct. 23, 2011. Two pages.
"Roland Olives Stuffed with Anchovies, 3-Ounce Dry Weight Can (Pack of 12)" sold by amazon.com, Inc., item model No. 71402; Amazon Standard Identification No. (ASIN) B000UXY2EM; retrieved from: http://www.amazon.com/Roland-Olives-Stuffed-Anchovies-3-Ounce/dp/B000UXY2EM, accessed on Oct. 23, 2011, earliest date of availability unknown. Two pages.
"Olive Packaging Investigated," dated Apr. 8, 2004, retrieved from: http://www.foodproductiondaily.com/Packaging/Olive-packaging-investigated, accessed Dec. 27, 2011. Two pages.
"Trade Standard Applying to Table Olives" from the International Olive Oil Council, Publication COI/OT/NC No. 1, Resolution No. RES-2/91-IV/04 (Dec. 2004).
Yada and Harris, "Olives: Safe Methods for Home Pickling," University of California Division of Agriculture and natural Resources, Publication No. 8267 (2007), 26 pages.
"Notification of Transmittal of the International Search Report and the Written Opinion of the International Searching Authority, or the Declaration", dated Jan. 2, 2015, in regards to International Application No. PCT/US2014/054581, International filing date Sep. 8, 2014.
Search Report and European Search Opinion for European Patent Appl. No. EP13782605, Supplementary Search Report and Opinion dated Nov. 26, 2015; 8 pages.

(56) References Cited

OTHER PUBLICATIONS

"Fruit and Vegetable Processing" by Mircea Enachescu Dauthy, in FAO Agricultural Services Bulletin No. 119, of the Food and Agriculture Organization (FAO) of the United Nations (Rome, 1995); 249 pages.
Notification Concerning Transmittal of International Preliminary Search Report on Patentability for PCT/US2014/054581 dated Mar. 2, 2016; 11 pages.
Extended European Search Report, including the Supplementary European Search Report and the European Search Opinion, in relation to EP Application No. 14842268.6, Communication dated Apr. 4, 2017, on 11 pages total.
Unexamined German Patent DE10354445.A1, German Patent and Trademark Office, titled "Method and Production of Black Olives That Are Blackened by Alkaline Oxidation, Bottled or Canned and Sterilized Without Salt Brine," to Amador Iglesias, published Jun. 24, 2004, on 6 pages. English translation obtained and provided by Applicant.
Notification of Preliminary Search with Opinion on Patentability, Kingdom of Morocco, Moroccan Office of Industrial and Commercial Property, in relation to Morocco Patent Application No. 38902, titled "Olives Containing Low-Acid and No Brine," dated May 4, 2017, on 6 pages. English translation obtained and provided by Applicant.
Notifications des Rapports de Recherché Preliminaire Avec Opinion sur la Brevetablilte, Royaume du Maroc, Office Marocain de la Propriete Industrielle et Commerciale, Objet Demandes de brevet d'invention No. 38902, Intitule de l'invention "Olives Conditionnees faiblement acides et sans saumure," May 4, 2017.
Communication dated Jul. 12, 2018 from the European Patent Office containing an Examination Report in regard to EPO Patent Application No. 13782605.3, which is a National Entry in the EPO from PCT International Application Serial No. PCT/US2013/038529; on 7 pages.
Communication dated Aug. 17, 2018 from the European Patent Office containing an Examination Report in regard to EPO Patent Application No. 14842268.6, which is a National Entry in the EPO from PCT International Application Serial No. PCT/US2014/054581; on 8 pages.
Black Thrumba Olives product description. From Vita Verde Schwarze. Dated 2011. Obtained from Mintel Group Ltd. products database <www.gnpd.com>; on 10 pages.
"Green Olives & Basil" product description. From Borges-Tramier. Dated 2012. Obtained from Mintel Group Ltd. products database <www.gnpd.com>; on 4 pages.
Pradas et al., "The use of high hydrostatic pressure (HHP) treatments for table olives preservation," Innovative Food Sciences and Emerging Technologies 13;64-68 (2012).
"The Guide to pH Measurement in Food & Drink," Version 1.0, author Kyle Hildebrant from Our Daily Brine blog (2016), obtained from <ourdailybrine.com/ph-guide/>, on 29 pages.
"How can I measure the pH of food?" from CamLab's Blog and Information Database—The Laboratory People, by Sophie Bryant (Aug. 28, 2015), obtained from <http://camblab.info/wp/index.php/how-can-i-measure-the-ph-of-food/>; on 8 pages.
"Measuring pH in Acidified Foods," Hanna Instruments informational publication and product descriptions, obtained from <hannainst.com>, publication date unknown, on 24 pages.
Anonymous, "Retort pouch," Wikipedia, Aug. 14, 2013, https://en.wikipedia.org/w/index.php?title=Retort_pouch&oldid=568554291, pp. 1-3.
Application No. 13782605.3-1106, Communication pursuant to Article 94(3) EPC, dated Apr. 5, 2020, 6 pages.
Application No. 13782605.3-1106, Communication in response to your enquiry received on Apr. 23, 2020, dated May 7, 2020, 1 page.
Application No. EP14842268, Annex to Form 2088, Codingdate, 4 pages.
Communication dated Feb. 6, 2018 from the European Patent Office containing an Examination Report in regard to EPO Patent Application No. 14842268.6, which is a National Entry in the EPO from PCT International Application Serial No. PCT/US2014/054581; on 5 pages.
Correspondence with Final Office Action from the United States Patent and Trademark Office <www.uspto.gov>, in regard to U.S. Appl. No. 14/480,346 (now published US2015/0072051), Communication dated Feb. 6, 2018.
Eden-Trade.com, "Eden Trade, Export Representative of Greek Products," "Greece is well known for producing the world's finest olives," retrieved from <https://web.archive.org/web/20140503042404/http://www.eden-trade.com/products.olives>, dated 2004.
Correspondence in French, dated Jan. 18, 2018, Office Marocain de la Propriete Industrielle et Commerciale (OMPIC), Decision Portant Rejet Partiel d'une Demande de Brevet D'Invention, Rapport de Recherche Definitif Avec Opinion Sur La Brevetabilite, No. de la demande: 38902. On 7 pages.
English Translation of Correspondence (original in French), dated Jan. 18, 2018, Moroccan Office of Industrial and Commercial Property (OMPIC), Decision of Partial Rejection of a Patent Application with Final Search Report with an Opinion on the Patentability, in regard to OMPIC Patent Application No. 38902, which is a National Entry of PCT International Application Serial No. PCT/US2014/054581; on 9 pages.
Patent Publication, Brevet D'Invention, Office Marocain de la Propriete Industrielle et Commerciale (OMPIC), Publication No. MA 38903 B1, publication dated Nov. 30, 2017, entitled "Olives Conditionnees Faiblement Acides Et Sans Saumure," with accompanying Search Report and Opinion.

* cited by examiner

Retort Process # 1

| Segment | 1 | 2 | 3 | 4 | 5 | 6 | 7 | 8 | 9 | 10 | 11 | 12 | 13 |
|---|---|---|---|---|---|---|---|---|---|---|---|---|---|
| Time (min) | 8.0 | 5.0 | 10.0 | 12.0 | 1.0 | 8.0 | 12.2 | 1.0 | 7.0 | 4.0 | 4.0 | 2.0 | 12.0 |
| Set Point (°F) | 170.0 | 200.0 | 209.0 | 221.0 | 221.0 | 220.0 | 220.0 | 190.0 | 180.0 | 140.0 | 100.0 | 80.0 | 80.0 |
| Type | Ramp | Ramp | Ramp | Ramp | Hold | Ramp | Hold | Ramp | Ramp | Ramp | Ramp | Ramp | Hold |
| Min. °F | 5.0 | 5.0 | 2.0 | 2.0 | 2.0 | 1.0 | 1.0 | 5.0 | 6.0 | 6.0 | 6.0 | 5.0 | 3.0 |
| Max. °F | 2.0 | 2.0 | 2.0 | 2.0 | 2.0 | 2.0 | 2.0 | 5.0 | 6.0 | 6.0 | 6.0 | 5.0 | 3.0 |
| Set Point | 3.0 | 5.0 | 12.0 | 19.0 | 19.0 | 19.0 | 19.0 | 18.0 | 12.0 | 8.0 | 4.0 | 3.0 | 3.0 |
| Type | Ramp | Ramp | Ramp | Ramp | Ramp | Hold | Hold | Hold | Ramp | Ramp | Ramp | Ramp | Hold |
| Min. | 2.0 | 2.0 | 2.0 | 2.0 | 2.0 | 1.0 | 1.0 | 2.0 | 4.0 | 2.0 | 2.0 | 2.0 | 2.0 |
| Max. | 2.0 | 2.0 | 2.0 | 2.0 | 2.0 | 1.0 | 1.0 | 2.0 | 4.0 | 2.0 | 2.0 | 2.0 | 2.0 |
| Phase | Come Up | Come Up | Come Up | Come Up | Come Up | Cook | Cook | Micro-cool | Full Cool | Full Cool | Full Cool | Full Cool | Full Cool |

FIG. 7A

Retort Process # 2

| Segment | 1 | 2 | 3 | 4 | 5 | 6 | 7 | 8 | 9 | 10 | 11 | 12 | 13 |
|---|---|---|---|---|---|---|---|---|---|---|---|---|---|
| Time (min) | 8.0 | 5.0 | 10.0 | 12.0 | 1.0 | 8.0 | X | 1.0 | 7.0 | 4.0 | 4.0 | 2.0 | 12.0 |
| Set Point (°F) | 90.0 | 210.0 | 238.0 | 251.0 | 251.0 | 251.0 | 251.0 | 245.0 | 180.0 | 140.0 | 100.0 | 80.0 | 80.0 |
| Type | Ramp | Ramp | Ramp | Ramp | Hold | Ramp | Hold | Ramp | Ramp | Ramp | Ramp | Ramp | Hold |
| Min. °F | 5.0 | 5.0 | 2.0 | 2.0 | 2.0 | 1.0 | 1.0 | 5.0 | 6.0 | 6.0 | 6.0 | 5.0 | 3.0 |
| Max. °F | 2.0 | 2.0 | 2.0 | 2.0 | 2.0 | 2.0 | 2.0 | 5.0 | 6.0 | 6.0 | 6.0 | 5.0 | 3.0 |
| Set Point | 3.0 | 6.0 | 20.0 | 31.0 | 35.0 | 35.0 | 35.0 | 34.0 | 12.0 | 8.0 | 4.0 | 3.0 | 3.0 |
| Type | Ramp | Ramp | Ramp | Ramp | Ramp | Hold | Hold | Hold | Ramp | Ramp | Ramp | Ramp | Hold |
| Min. | 2.0 | 2.0 | 2.0 | 2.0 | 2.0 | 1.0 | 1.0 | 2.0 | 4.0 | 2.0 | 2.0 | 2.0 | 2.0 |
| Max. | 2.0 | 2.0 | 3.0 | 2.0 | 2.0 | 1.0 | 1.0 | 2.0 | 4.0 | 2.0 | 2.0 | 2.0 | 2.0 |
| Phase | Come Up | Come Up | Come Up | Come Up | Come Up | Cook | Cook | Micro-cool | Full Cool | Full Cool | Full Cool | Full Cool | Full Cool |

FIG. 7B

STUFFED, FLAVORED AND PACKAGED OLIVES

CROSS-REFERENCE TO RELATED APPLICATIONS

This application is a national entry of International Patent Application Serial No. PCT/US13/38529, filed Apr. 26, 2013, which claims benefit of U.S. Provisional Application Ser. No. 61/639,731, filed Apr. 27, 2012.

FIELD OF THE INVENTION

The invention relates generally to the field of food products. More specifically, the invention provides processed and packaged ready-to-eat olives, and also relates to the methods for producing the processed and packaged olives.

BACKGROUND OF THE INVENTION

Edible olives are available in a wide array of styles and packing. Some of this diversity comes from the inherent properties of the many known olive cultivars, but treatment and processing of the olives generates an even broader range of organoleptic properties, affecting color, texture, odor, taste and appearance. Other qualities, such as packaging convenience, shelf life and nutritional value also impact the appeal of any given olive preparation.

The olive tree, *Olea europaea*, produces the olive fruit, a drupe of approximately 1.0-2.5 centimeters. The drupe has a firm flesh (also termed the meat of the olive), covered by a thin skin, with a hardened pit in the center. Centuries of cultivation has resulted in numerous subspecies and thousands of varieties (also termed cultivars). Among the most commercially significant cultivars are Amfissa, Arbequina, Ascolano, Barnea, Barouni, Bosana, Cornicabra, Empeltre, Frantoio, Leccino Gemlik, Gordal, Hojiblanca, Kalamata, Koroneiki, Manzanillo (Manzanilla), Lucques, Maalot, Mission, Nabali, Malissi, Patrinia, Picholine, Picual, Rubra, Sevillano, Souri and BARIZAITOON-1 and BARIZAITOON-2.

The natural color of the olive varies widely among the different varieties. Some olive varieties are green when immature, and darken to a burgundy or black while ripening on the tree (termed "natural black" olives). However, a black olive color does always correlate with degree of natural ripeness. Some varieties remain green during all stages of growth and never acquire a dark color. Some varieties are allowed to ripen and obtain a dark color on the tree, while other varieties are intentionally picked in an unripe state. Additionally, the color of the olive in the consumer market does not correlate with natural ripeness; in the US market, black olives account for the majority of sales, and these olives are black as a result of the processing methods, not natural ripeness. Olives that acquire a black color from post-harvest processing are commonly termed "black ripe" olives.

When freshly picked from the tree, olives often have an intrinsic bitter flavor due to the presence of the polyphenolic compound oleuropein. The American market has a distaste for this bitter flavor. To alleviate or remove this bitterness, olives are typically "cured" using one of the known traditional de-bittering methods, namely water curing, brine curing, fermentation, and lye curing.

Water-curing of olives involves submersion of the olives in fresh water for an extended period of time, which may be several weeks or longer. Water-curing is not as effective as the other traditional methods in removing the bitter taste, and water cured olives typically remain slightly bitter. Brine-curing involves the soaking of olives in a highly concentrated salt solution, typically but not exclusively sodium chloride. Brining of olives, similar to brining other types of fruits or vegetables, can be used to bring about certain desired properties in a food, and also has the effect of acting as a preservative. However, brine curing is sometimes only partially effective at debittering the olive flesh, and is accompanied by some undesired effects. Brine-curing of olives, similar to water curing, can take many months, and can result in changes in flavor and phytonutrient composition of the olive, often accompanied by excessive softening of the olive flesh, and brining methods are incompatible with the use of some types of flavorings, seasonings and other types of foods that might be co-packaged with the olives. In addition, the olive brining process to debitter the olive generates large volumes of liquid brine waste which adds to the cost and complexity of production. The term "olive pickling" is sometimes used synonymously with olive brining. With some methods, the finished olives are packaged in a brine solution for final shipping and consumption.

Olive fermentation, by itself, is also considered a curing process. Fermentation is the biological process whereby the endogenous sugars found in a fruit are metabolized by microorganisms to produce acidic products. Fermentation of the olive produces lactic acid or acetic acid, and this fermentation changes the organoleptic properties of the olive, which, in some processing, adds a distinctive and desired flavor to the olive. Olive fermentation is thought to have a secondary effect of freeing the oleuropein molecules from the olive flesh and allow them to diffuse into the surrounding liquid. Olive fermentation can be used by itself, or in conjunction with other curing methods, most typically brining.

Lye-curing is the predominant method for olive curing. This treatment involves the submersion of the olives in a strong alkali solution, comprising either sodium hydroxide (NaOH) or potassium hydroxide (KOH). The strong alkali hydrolyzes and chemically neutralizes the oleuropein content, thereby removing the bitter taste. Lye-curing usually occurs in a series of sequential steps, or "cuts," where a first lye bath will cure the skin and outermost portion of the olive, followed by draining and exposure to a second and subsequent lye soakings that allow alkali penetration successively deeper into the olive flesh, which may eventually reach the olive pit.

The lye-curing can have an added effect of darkening the olive, where during the last stage of lye-curing and or washing, oxygen gas, or simply air, is bubbled up through the lye solution, resulting in an oxidation of the alkaline olive flesh, resulting in a deep black color. Fine tuning of the lye-treatment and blackening steps allows experienced olive producers to create olives that have desired properties with regard to the depth of alkali penetration, color tones and mottling that appears in the flesh and skins of the treated fruit. In the United States, canned California black olives are typically lye-cured and oxygen-darkened.

A wide variety of commercially available edible olive styles are available by using various combinations of curing methods and other treatment steps, various olive varietals and regional variations of these methods. However, there are approximately four standard processing technologies responsible for producing the majority of olive market in the United States. These are California style black ripe olives, California style green olives, Spanish style green olives and Greek style natural black olives.

California style black olives, also known as "black ripe" olives, are harvested from the tree green before fully ripening. This olive style entails using a lye treatment to debitter the olive, a wash step, exposing the olive to air and optionally other agents such as ferrous gluconate to turn and fix the olive flesh black, then brining (or pickling) the olive. California black-ripe olives are typically canned in a neutral (pH 6.5-7.5) brine for end stage distribution. California black ripe olives are most frequently pitted.

California style green olives are also harvested while green before they are fully ripe. They are subjected to lye curing, washed, then kept submerged (typically a neutral brine) and/or in sealed containers to minimize oxidative blackening from exposure to ambient air, and then packaged. The olive skin and flesh retain their green color. In the United States, this production style creates green olives that are typically sold pitted and unstuffed.

Spanish style green olives follow a different production method. They are harvested green, and then are treated with lye to debitter the olive. However, this lye treatment is often an intentional under-treatment, where the lye is not allowed to completely penetrate the full depth of the olive flesh. After the lye cut, the olives are placed in sealed vessels and allowed to undergo a natural fermentation process. This fermentation can be initiated by the native microbial flora on the olive surface, or in the case of large scale processing facilities, can be more tightly controlled by the addition cultured laboratory strains of bacteria and/or yeast. The fermentation converts the sugars contained in the olive into acidic respiratory byproducts, turning the olive flesh acidic typically in the range of pH 3.5 to pH 4.2. The fermentation reactions may or may not include the addition of extra sugars to the culture mix. The fermentation process also gives the olive flesh organoleptic properties that are distinct from other production methods. These olives may retain a distinctive slightly bitter taste due to the lye cutting under-treatment. Spanish style green olives are typically packaged in an acidic brine and are the olive style that is commonly stuffed with red pimento in the United States.

Greek style natural black ripe olives, also termed simply "natural black" olives, are distinct from California style black ripe olives. The expression "natural black" is a heterogeneous category that encompasses a number of olive processing methods, but all of the olives generally share the feature of having been harvested in a natural black and tree-ripened state. These olives can be subjected to a wide range of treatments, including brining/pickling in salt brines or vinegar brines, fermentation, and salt packing.

The manner in which processed olives are served, alone and/or with other foods, or incorporated into recipes has limitless variety. Olives can be served whole, unpitted or pitted. Alternatively, olive flesh can be cut into segments in any number of ways, or mashed to produce a paste or puree. Methods, devices, machinery and technology for mechanical olive processing, including pitting, slicing, halving, quartering, chopping, mashing, or forming pastes or purees is well established in the industry, and readily available.

The final packaging step in many olive production methods is the transfer of the olives to a neutral or acidic brine solution, typically using cans or jars. Although using brine solutions has the beneficial effect of acting as a preservative for preventing spoilage and extending shelf life, in other respects, it is problematic. Leaving the olives packaged in a liquid brine solution makes them messy to eat, and the brine can easily spill from a can or jar. When packaged in the liquid brine, they are not "snack friendly," meaning that when one wants to snack on olives, one must first open a large can or jar of olives, drain the brine from the can or jar, then serve the olives on a plate or bowl. Presently, the packaging of olives in cans or jars typically provides more than one serving of olives, meaning that if only one person is opening and intending to eat the olives, some portion from the can or jar will go to waste. If one tries to retrieve just a single serving of a few olives from the large can or jar, the presence of the brine solution often creates a mess or drips. This multistep serving process from industry standard cans or jars is inconvenient. Furthermore, the presence of the brine prevents the inclusion of other food products that might be co-packaged with the olives that could enhance the appeal of the olives, for example but not limited to, other fruits, vegetables, cheese, flavorings and seasonings.

Commercially sold green olives may contain various fillings, infused flavorings or other co-packaged food materials, as known in the art. Spanish style green olives are most commonly used to prepare stuffed olives, due in part to the fact that green olives generally have a firmer flesh than black ripe olives, and as a result, are more resilient to the physical stresses caused by machinery used in large-scale automated stuffing/filling. Furthermore, green olives are preferred for making stuffed olives because the acidic packing brine used for green olives does not significantly degrade the color of the green olives, where in contrast, an acidic brine environment will fade the preferred deep black color of black ripe olives to a less attractive brown. In the United States, red pimento is most commonly used to stuff pitted Spanish-style green olives. Garlic, celery and onion fillings or co-packaged accompaniments are also used.

In the commercial setting, green olive stuffing can use actual vegetable pieces trimmed to a suitable shape and size for use in the stuffing process; however, this process is labor and cost intensive and not readily adaptable to large scale automation. Alternatively, the stuffing can comprise malleable segments of artificially formed food material. This material can be artificially colored and flavored, and is extruded or molded in some manner to form pliable (i.e., semi-rigid) sheets, ribbons or strips, which can be cut into suitable segments for insertion into the pitted olive. Flavored ribbons that mimic pimento are commonly used for olive stuffing. For example, see issued U.S. Pat. Nos. 4,006,256, 4,141,287 and 4,168,325, each of which is herein incorporated by reference in its entirety.

Olive stuffing using trimmed ribbons or sheets has various drawbacks. First, these methods are often too physically harsh to use on the delicate flesh of black ripe olives. Second, the available flavor choices for ribbon fillings are limited, and often would not complement the flavors of black ripe olives.

Alternatively, paste-type fillings have been proposed for stuffing pitted olives. See U.S. Pat. No. 4,663,174, which is herein incorporated by reference in its entirety. Paste filling techniques such as U.S. Pat. No. 4,663,174 face various technical challenges. First, the consistency (e.g., hardness or softness) of the paste filling must be optimized because paste-type fillings will have a tendency to slip out of the pitted olive and can leak and smear, causing unsightly smearing on the surface of the olive and on the end stage packaging. Second, paste type fillings must be optimized for taste sensation, for example, to avoid a mushy or slimy sensation while being eaten. Third, the paste filling formulations such as those used in U.S. Pat. No. 4,663,174 are optimized for olive packaging in a liquid brine. If these paste-stuffed olives were packaged without brine, these existing formulations would be suboptimal because loss of moisture in a brineless environment would cause shrinkage of the stuffing and likely create a loss of adhesion and a tendency for the stuffing to dislodge and fall out of the pitted olive.

The choices for stuffings and infused flavorings in the commercial setting are limited. Olive fillings that use more diverse flavors and complex favor combinations are not available, but would greatly add to the appeal of stuffed olives, in particular, flavorings that are optimized for use with black ripe olives. Furthermore, stuffings designed to complement the flavors of black ripe olives and that can be adapted to take into account the softer flesh of black ripe olives are virtually non-existent. The marketplace would greatly benefit from a wider variety of stuffing flavors, and more complex stuffings that utilize combinations of flavor ingredients.

Olives that have consumer appeal with regard to portability, ease of transport, packaging that is easily opened and/or resealable, mess-free eating, long shelf life and have a wider assortment of appealing stuffings and flavorings are desired in the marketplace. The invention described herein offers solutions to these problems, and also provides additional advantageous properties. The invention provides products and processes for making the products, that solve industry problems associated with packaging olives in liquid brine and problems and limitations associated with producing stuffed and flavored olives. The invention also provides olive preparations that can be packaged in a variety of useful container options, adding convenience and other benefits over the present state of the art. As a result, a wide variety of benefits flow from the invention that will become apparent upon reading the present disclosure.

What is needed is a black acidified olive that is stuffed using a flavored paste that can be packaged for easy portability and snacking using new packaging technology. In the olive industry, stuffed, acidified and brineless black olives have never been introduced because of a number of significant challenges. Acidified olives typically have an unappealing strong acidic or tart taste, and further, are not packaged in conveniently sized small containers, such as snack-size containers. Moreover, olives packaged without liquid look dull and wrinkled. Heat treating brineless olives to generate a sufficiently shelf-stable product has its own challenges in maintaining the integrity of the packaging container and quality of the product. The present invention, in its many embodiments, is proposed to overcome all of these challenges and provide olive products that have appealing organoleptic properties, desirable appearance and adequate shelf life for the marketplace.

SUMMARY OF THE INVENTION

Packaged olive preparations containing a plurality of olives or olive segments whose pH is not greater than about 4.6 are provided substantially free of liquid and packaged in a sealed container. In an embodiment, the shelf life of the preparation is between 12 and 24 months. In another embodiment, the olive preparation has an oil coating on the surface of the olives or olive segments. The oil may be selected from sunflower oil, winterized olive oil, purified olive oil, olive oil and/or mixtures of these oils. The preparation may be for black ripe olives, green olives or a mixture of olive varietals.

In another aspect, the present invention relates to an olive preparation that has an infused flavoring of at least one liquid spice extract, a flavored stuffing injected as a paste into the cavity of a pitted olive, and then solidified prior to packaging, or both infused flavoring and flavored stuffing. In the instance of the flavored stuffing injected as a paste, the flavored paste contains sodium alginate in a concentration of 1% to 5%. Once injected into the olive cavity, the flavored paste is solidified by exposure to calcium containing solutions.

In another embodiment of the invention, blackened olives are acidified to a pH of not more than about 4.6 by exposure to a brining solution comprising at least one organic acid acidulant selected from the group consisting of lactic acid, glucono-delta-lactone (GDL), citric acid, malic acid and adipic acid. The brining solution can comprise a single acidulant, or can contain combinations of these acidulants. In some embodiments, the brining solution can optionally also comprise calcium, liquid flavorings, and/or agents such as flavor enhancers or flavor masking agents, or sweeteners.

In still other embodiments, the invention provides methods for producing the olive preparations of the invention, and furthermore, also provides apparatus and mechanical systems for use with the methods of the invention.

BRIEF DESCRIPTION OF THE DRAWINGS

FIG. 3A provides an illustration showing a view of a single individual serving cup. FIG. 3B provides a longitudinal cross section of the individual serving cup of FIG. 3A. FIG. 3C provides an illustration view of a "multi-pack" comprising four individual serving cups packaged as a single unit for commercial sale.

FIGS. 7A and 7B provide tables that provide detailed steps of two retort processing protocols. FIG. 7A provides the procedural steps of a retort process that uses a 221° F. retort. FIG. 7B provides the procedural steps of a retort process that uses a 251° F. retort with water spray.

DETAILED DESCRIPTION OF THE INVENTION

Figure 1:
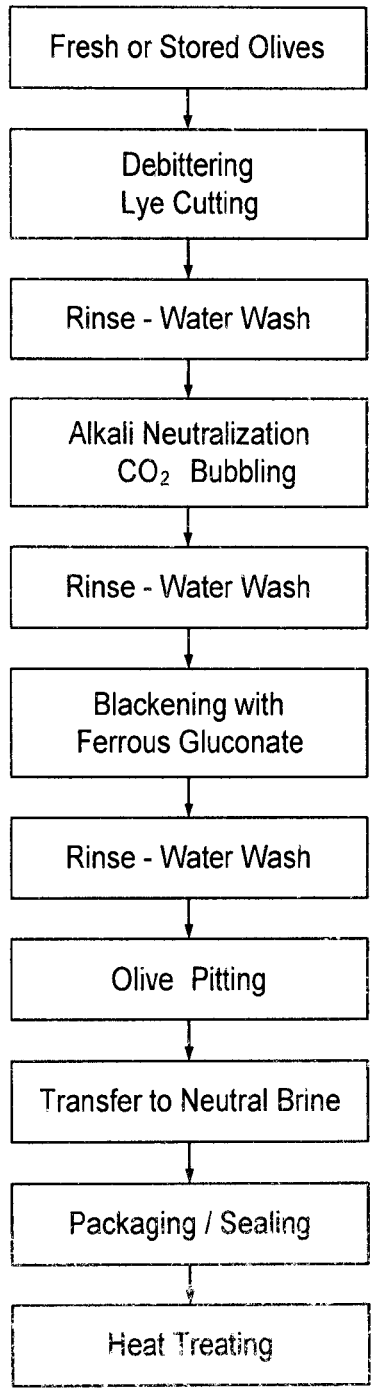
FIG. 1 provides a flow-chart illustration depicting a traditional method for producing California style black ripe olives.

The present invention provides compositions and methods for the production of olive preparations. These olives preparations, and the methods for making the same, have a number of advantages over the state of the art, which will be apparent from the discussion herein.

An olive preparation that can be packaged without brine would provide numerous advantages over the present industry paradigm. An olive that is acidified as the final production step would provide these advantages. The benefit an acidified olive product lay in the fact that an acidified olive product would allow the olives to be packaged without any liquid brine solution in the packaging container. The acidified olive flesh would make the olive sufficiently resistant to spoilage and retain sufficient shelf life to permit packaging without any free liquid brine. Preparations of olives that are substantially free of co-packaged liquid, e.g., liquid brine or any other liquid, has various advantages, including convenience, ease portability, reduced mess upon opening and eating, reduced weight, and permits a wider range of options for olive stuffings, flavorings and co-packaged food material that increases the appeal of the olives.

In one aspect, a brineless olive preparation in an individual sized serving is appealing because it is "snack friendly," where there is little or no mess from liquid brine that can spill from the can or jar, or drip from the olive once the olive is out of the can or jar. Olives packaged as individual, snack-size servings (intended for one person), without a messy liquid brine solution would hold great appeal for many consumers, especially for children who might include the olive single servings in lunches or on-the-go snacks.

In other beneficial aspects, brineless olive preparations will also have appeal in situations where larger quantities are served, displayed or transported. This includes larger packaging options suitable for family sized servings and parties, olive arrangements on aesthetically pleasing platters or trays, and containers having volumes large enough for use in delicatessens and restaurants. Furthermore, if the olives are to be part of a food display, for example, in a delicatessen or restaurant, they can be packaged in aesthetically appealing sealable containers. Also, when the olive packaging is in large volumes, packaging without liquid brine will result in lighter weight containers and products, thereby reducing strain on food service providers and possibly reducing shipping costs.

In still other beneficial aspects, the olive preparations of the invention can contain unique stuffings, infused flavorings, and/or co-packaged food items. Methods for producing such olive preparations are also provided, as described herein. In one embodiment, for example, the invention provides an acidified black ripe olive that is brineless and is also stuffed. In other embodiments, the olives are stuffed using a novel method, as described herein.

The invention is characterized by a number of distinguishing characteristics. All of these features may be present in one embodiment of the invention. Alternatively, and more advantageously, distinguishing characteristics of the invention can be used in sub-combinations, or individually, in other embodiments of the invention. That is to say, it is not required that all aspects described herein be present in a single embodiment in order to be encompassed by the intended scope of the invention. The invention is characterized by a number of different embodiments.

I. Acidified Olives that are Free of Liquid Brine

The present invention provides novel preparations of ready-to-eat olives, meaning that no other processing steps are intended prior to eating. As used herein, the term "preparation" refers to an intentional assemblage of specific components that make up the whole. In some aspects herein, when a preparation of the invention is a preparation of olives, that preparation comprises olives that are characterized by distinguishing properties, and/or in combination with other requirements, such as the olives be packaged in a particular manner, and/or with other edible components included in addition to the olives.

In some aspects, the description of an olive preparation of the invention implies that certain self-evident steps were taken to prepare the preparation. For example, if a preparation of the invention comprises black ripe olives, it is assumed that a suitable process is used to produce the black ripe olives. In another example, if an olive preparation of the invention comprises a sealed container, it is assumed that a container suitable for food storage was used, and a process suitable for sealing the olives in the container is used.

In some aspects, if a preparation of olives of the invention is subjected to some type of processing, that processing can impart known, quantifiable and/or ascertainable properties on the preparation of olives. For example, if an olive preparation of the invention is heat-treated, then it is understood that the olive preparation is shelf stable and has an adequately long shelf life, for example, a shelf life of at least 12 months, and preferably longer, for example at least 24 months, or any value between 12 and 24 months. Similarly, if the containers of the invention containing the olives are subjected to vacuum, nitrogen flashing, sealing, and then heat treatment, it is understood that the preparation is shelf stable and has an acceptably long shelf life. In various aspects, the olive preparations of the invention can simply be sealed in a container without vacuum and without nitrogen flashing. Alternatively, the olive preparations of the invention can be sealed either under vacuum, or following a nitrogen gas flush. Alternatively still, vacuum packing and nitrogen flush can both be used to seal the container containing the olives of the invention.

In still other aspects, the olive preparations of the invention are not heat treated. In those embodiments, it is understood that the preparations may have a shorter shelf life than heat treated olives. Optionally, both heat treated and non-heat treated preparations of the invention can be refrigerated at any stage during and post production, including continuous refrigeration during the entire production and distribution process all the way to the point of sale.

In one aspect, the invention provides preparations of olives where the flesh of the olive is acidic. In some embodiments, the flesh of the olive is acidified to a pH of not greater than about pH 4.6. Alternatively, in other embodiments, the pH of the olive is not greater than about 4.5, about 4.4, about 4.3, about 4.2, about 4.1, about 4.0, about 3.9, about 3.8, about 3.7, about 3.6, about 3.5, about 3.4, about 3.3, about 3.2. In some aspects, the acidified olives of the invention have a pH that is within a defined range. For example, preparations of olives can comprise olives where the flesh of the olive is within the range of pH 3.2 to pH 4.6. In other embodiments, the pH of the flesh of the olive is within the range 3.2 to 4.6, or alternatively, 3.8 to 4.5, or 3.8 to 4.6, or 4.2 to 4.5, or 4.2 to 4.6, or 3.8 to 4.6, or 3.8 to 4.2, or 3.2 to 4.2. In these embodiments, the pH of the olive flesh can be finely adjusted to any desired specific value (within instrumentation accuracy, for example, +/−pH 0.1), or within a defined range of values. Factors such as choice of the particular acidulants that are used, their concentrations and the length of the acidulant treatments (among other controlling factors) can be manipulated to control pH of the olive meat.

In one aspect, the invention provides preparations of olives where the preparation is substantially free of liquid. As used herein, the expression "substantially free of liquid" means that the preparation contains insufficient volume of a co-packaged liquid for the liquid to be able to flow or pour freely from the packaged preparation of olives (if the container comprising the olives is opened) or flow over the olives within the container. The possible liquids are any liquid that might be used in olive co-packaging, including brine, water or oil. As used herein, the expression "brineless" means that the olive preparation is substantially free of liquid brine solution, that is to say, there is insufficient liquid brine solution to flow from a container or flow over the olives in the container. The olives in a brineless preparation of olives may have been treated or soaked in a brine solution prior to packaging in a container, but that preparation is still termed "brineless" or "substantially free of liquid" if there is insufficient liquid volume present to flow or pour from the container.

In other aspects of the liquid-free olive preparations of the invention, the expression "substantially free of liquid" means that the preparation contains an inconsequential volume of free-flowing liquid, where that inconsequential volume does not impair the intended advantages of having a liquid-free olive preparation. For example, very small inconsequential volumes of liquid may appear at the bottom of the sealed olive container following heat treatment due to the cooking process and condensation. Olive preparations having such small volumes of liquid are encompassed within the definition of "substantially free of liquid" and do not impair the intended benefits of the invention.

In olive preparations of the invention, the olive style, varietal, size, color, quantity, volume, organoleptic properties, or taste sensation is not intended to be limiting in any way, unless otherwise stated. It is not intended that the invention be limited to any particular olive varietal, or combination of varietals, to produce the olive preparations of the invention. Although the olive varietals manzanillo and sevillano are commonly used to produce the black ripe olive preparations of the invention, it is not intended that the invention be in any way limited to the use of these two varietals, as other varietals may also be used, which is understood by one of skill in the art. In some aspects, an olive preparation of the invention comprises a single varietal of olive. In other aspects of the invention, an olive preparation of the invention can comprise any combination of olive varietals in a single olive preparation.

In still other aspects, an olive preparation of the invention can comprise a single olive style, for example, an olive preparation of the invention comprising only black ripe olives. In other embodiments, an olive preparation of the invention can comprise an olive style other than black ripe olives, such as but not limited to California style green olives, Spanish style green olives, and any specialty variety of olives. Furthermore, combinations of olive styles that are copackaged also are included in the present invention, where such combinations can add to the appeal and aesthetic of an olive preparation of the invention.

In one aspect, olive preparations can include whole or substantially whole unpitted olives, i.e., where the olive flesh is intact or largely intact following the olive processing, as it would be on the drupe. In contrast, an olive preparation of the invention can comprise pitted olives, i.e., without the stone pit. Olive preparation s of the invention that are stuffed will typically use pitted olives.

Alternatively, the olive material in the preparations of the invention can be subjected to some degree of mechanical processing of the olive flesh. For example, this includes black ripe olives that have been cut into segments in any number of ways, where the segments are smaller than the whole olive (i.e., the olives are segmented). When provided as olive segments, the degree of segmentation or processing is not limited, for example, olives can be halved, quartered, minced, mashed or pureed. Olives can also be sliced, where generally the olive flesh is sliced to produce olive pieces that are approximately uniform in thickness. It is not intended that olive preparations of the invention be limited to whole olives, pitted or unpitted, or any particular segmented or processed olive material, unless specific language indicates otherwise. Methods, devices, machinery and technology for olive mechanical processing, including pitting, slicing, halving, quartering, chopping, mashing, or forming pastes is well established in the industry, and readily available.

II. Methods for Olive Blackening

In some aspects, the invention provides methods for olive blackening when producing California style black ripe olives. For example, as provided in Example 3, the shortcomings of using ferrous gluconate led to the testing of ferrous lactate as a blackening agent. It was noted that the olives blackened with ferrous lactate were slightly darker in color when compared to olives blackened with ferrous gluconate. It was also noted that the olives colored with ferrous lactate obtained the color faster than olives colored with ferrous gluconate. It was observed that the use of ferrous lactate also had certain advantages, including better black color retention during the olive acidification step in the production of acidified, brineless black ripe olives. Therefore, ferrous lactate emerged as the preferred oxidizing agent. The ferrous lactate can be used in the blackening process in a concentration of about 0.02-0.08% by weight of the olives when the olives are in the pH range of 9.5-8.5.

It is not intended that the compositions or methods of the invention be limited to utilizing any particular method for olive blackening when California style black ripe olives of the invention are used, unless specifically recited to the contrary. For example, the methods of the invention can utilize ferrous gluconate blackening in place of ferrous lactate blackening. Furthermore still, any suitable oxidizing agent can be used in for olive blackening in the invention, for example, manganese gluconate. Similarly, it is not intended that the invention be limited to the use of any particular method for olive curing (debittering). For example, the invention can utilize curing by water curing, brine curing, fermentation, lye curing or chemical curing.

III. Methods for Producing Acidified Olives Free of Liquid Brine

Figure 2:
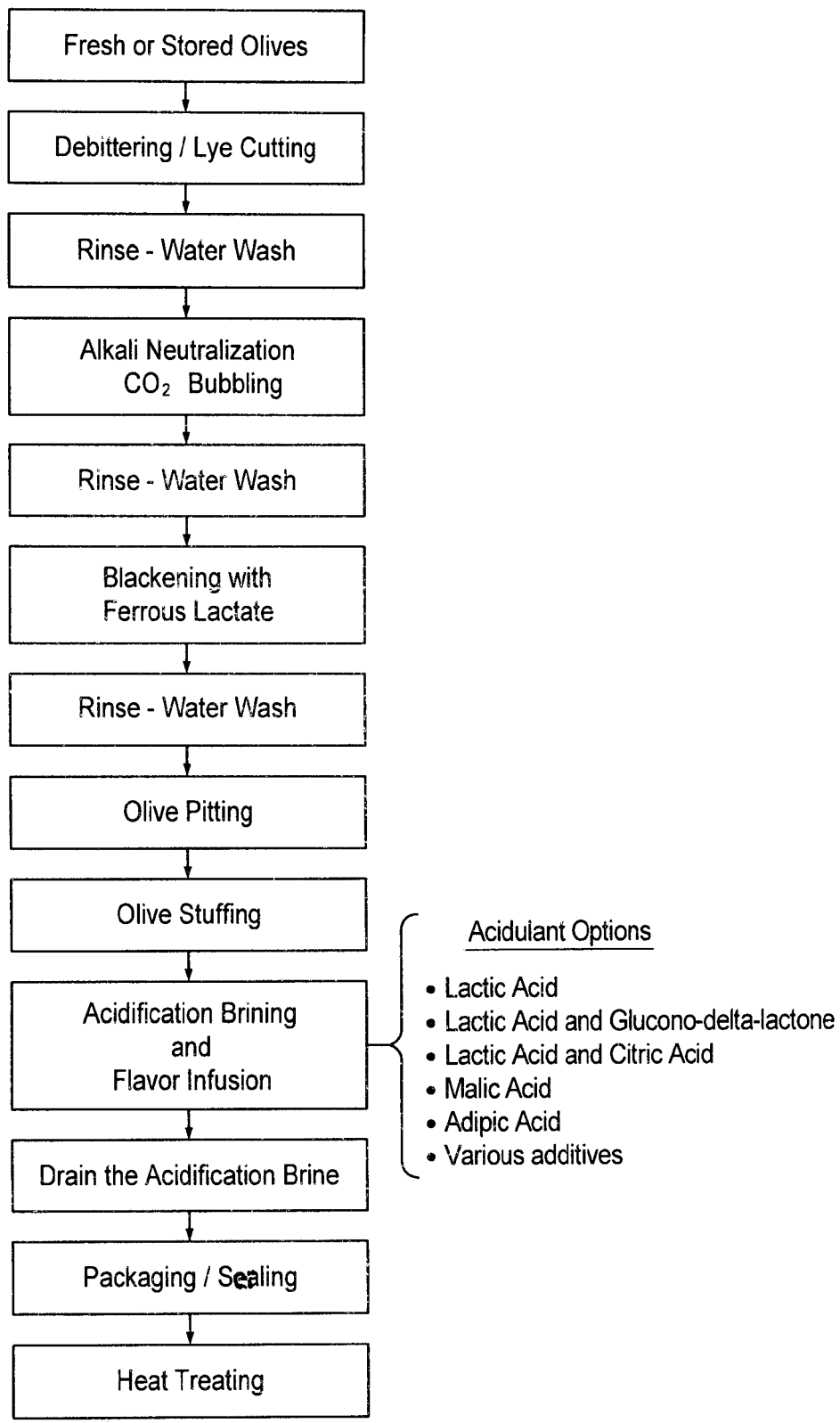
FIG. 2 provides a flow-chart illustration depicting methods for producing acidified black ripe olives that are free of liquid brine.

The present invention provides methods for preparing acidified and brineless olive preparations. Furthermore, the invention also provides the olives produced by these methods. As shown generally in FIG. 2, and described in detail in Example 3, these methods of the invention provide multiple options for reagents to use in the acidification step. For example, the acidification step can utilize a variety of acidulants, different salt concentrations and different sweetening agents in the base brine solution. Extensive experimentation with different acidulants, salt concentrations and sweetening agents in the olive acidification step culminated in the identification of preferred acidulants, preferred acidulant concentrations, preferred salt concentrations and preferred sweetening agents. TABLE 1A provides the formulation of the base brine solution. TABLE 1B provides acidulants and acidulant concentrations.

TABLE 1A

| Base Brine Solution |
|---|
| ~94.00% water (by weight); |
| 1.0-2.5% sucrose (by weight); |
| 3.1-4.2% sodium chloride salt by weight. |
| Salinity range: 12-16° |
| Water content in the base brine is adjusted when small liquid volumes of stock acidulant are used to make the acidification brine solution. |

TABLE 1B

| | Acidulant (and concentration) |
|---|---|
| Option 1 | Lactic Acid alone (most preferred option) 0.75-0.90% 0.80% is one preferred concentration |
| Option 2 | Lactic Acid (0.35-0.50%) Citric Acid (0.35-0.50%) |
| Option 3 | Lactic Acid (0.55-0.70%) Glucono-Delta-Lactone (GDL) (0.45-0.60%) |
| Option 4 | Malic Acid (0.45-0.60%) |
| Option 5 | Adipic Acid (0.45-0.60%) |

Effective acidulants can be either a single acidifying agent or combinations of acidulants. One preferred acidulant treatment is the use of lactic acid in a concentration range of about 0.75% to about 0.90%, where a concentration of about 0.80% is one preferred concentration within this range. In other preferred embodiments, combinations of lactic acid with either citric acid or glucono-delta-lactone (GDL) can be used, in concentrations as shown in TABLE 1B. In still other embodiments of the invention, malic acid or adipic acid can be used as the acidulant in the base brine. Wide ranges of acidulant concentrations were tested to find the optimal concentration ranges shown in TABLE 1B.

In another series of tests, olives were acidified using base brine solutions having a wide range of salinities. Salinities in the range of 12-24° were tested. It was found that salinities in the range of 12-16° were effective, and within this range, a salinity of 14° is one preferred embodiment, and in some cases, had the beneficial effect of slightly masking the acidic tart flavor of the acidulant.

The olive treatment time in the acidification brining solution is typically in the range of 12 to 24 hours. The acidification treatment soaking is generally done at room temperature, or within a reasonable range of acceptable room temperature. The tanks in which the acidification brining takes place can optionally be heated or cooled (e.g., refrigerated) for the purpose of maintaining batch consistency in situations where there are extremes of heat or cold ambient air.

Optionally, the base brining mix can also contain other beneficial components, such as masking agents or flavor enhancers, which, although not necessary for effective acidification of the olive, impart improved taste qualities to overcome the undesirable bitter taste of the acidified olive product. These masking agents and flavor enhancers can include, but are not limited to, MSG, Smoothenol (Sensient), Ottens Natural Enhancer, Ottens "Inhibitter", "Natural Flavor Blend", and Bell Flavors Natural Masking Agent. It is not intended that the present invention be limited to the use of these particular additives listed above, as one of skill will recognize that any flavoring enhancer or masking agent can be used with the present invention.

In some embodiments of the invention, sucrose is a component of the acidification brining solution. In other embodiments, other sweetening agents such as beet syrup (e.g., 4% by weight) can be used as a substitute for the sucrose in the acidification brine. It is not intended that the invention be limited to the use of either sucrose or beet syrup, as one of skill will recognize that other sweetening agents or combinations of sweetening agents can be alternatively used in the acidification base brine solution.

Below is a table describing one preferred acidification brining formulation.

TABLE 2

| Acidification Brining Solution | Weight (g) | Percentage |
|---|---|---|
| Water | 933.00 | 93.30% by weight |
| Sucrose | 20.00 | 2.00% by weight |
| Salt (sodium chloride) | 40.00 | 4.00% by weight |
| Lactic Acid Solution, 88% stock | 8.03 | 0.80% by solution weight |
| OTTENS FLAVORS ® Sweetness Flavor Enhancer, Natural (alternatively, can use SENSIENT Smoothenol ® Natural Masking Liquid) | | various |

IV. Olive Packaging

The olive preparations of the invention provide olives that are packaged and sealed in suitable containers. In some embodiments, the containers used in the olive preparations of the invention are sealed by a plastic film or foil covering using a suitable adhesive. The container is opened by peeling away the lidding material. Optionally, the sealed container can further comprise a secondary mechanism over the plastic film or foil covering, ideally where this secondary covering can be removed and reapplied as a lid to form a resealable container after the plastic film or foil covering has been removed.

It is not intended that the olive packaging containers used in conjunction with the olive preparations of the invention be limited in any way, for example, by size, materials, shape, volume of the containers, weight or volume of the packaged olives, or intended use, except where specifically recited. In some embodiments, the olive preparations of the invention can be packaged into any suitable sealable container. In some embodiments, the olive preparations can be packaged into a rigid or semi-rigid plastic cups or larger plastic containers, where the plastics used can be any suitable plastic or other polymer. In other aspects, the olive preparations of the invention can be packaged in resealable bags or pouches (e.g., resealable by a zip-lock type closure), traditional steel cans, which may or may not be tin-plated, or in glass jars with resealable steel caps or plastic lids.

In some embodiments, the plastic containers are formed from ethylene vinyl alcohol, abbreviated EVOH, a copolymer of ethylene and vinyl alcohol. EVOH has advantageous properties, notably its ability to serve as an effective oxygen barrier. In other embodiments, containers used to package the olive preparations can be formed from co-extruded polymers containing EVOH, or alternatively still, the containers can be formed from other polymers that are then laminated with a thin layer of EVOH. The packaged olive containers, or lidding material for containers, can also be formed from multilayer structures containing a thin layer of EVOH laminated on or between layers of cardboard, foil or other plastics. In some embodiments, the plastic containers used for packaging the olive preparations are made from a polypropylene material containing an elevated level of EVOH as the oxygen barrier.

In some embodiments, the cups or containers are sealed with a thin lidding material such as foil film or a plastic film, which forms a seal by attachment with an adhesive. In some aspects, olive preparations that are packaged into rigid or semi-rigid plastic cups or larger plastic containers are sealed with a lidding material. The lidding material can be any suitable material, for example but not limited to, a metallic foil (e.g., an aluminum foil) or a polyethylene (plastic) film, as known in the industry and are applied with an adhesive to the plastic cup or container, and are removed by peeling off of the film. The films are typically not resealable after they are removed.

In some embodiments, the plastic cups or containers used in the olive preparations are sealed with a metallic foil or plastic film lidding material, and can optionally further comprise a reusable lid (an overlid), cap or cover. This lid, cap or cover is used to reseal the container after the lidding material is removed. The reusable lid can be made of any material, for example, a flexible polypropylene, and for example, can be a snap-on type lid or a screw-type lid.

In one aspect, an olive preparation of the invention is packaged in a suitably sealed individual serving. This single serving ideally has ease of portability, and allows for mess-free eating where little or no residue from the olives might get on one's fingers while eating. This single serving container may be sealed in a manner that allows easy opening without exertion nor requiring good hand strength, as is often required for jars or cans.

In some embodiments, the olives that are contained in individual serving size olive preparations, also termed a "snack size" or "snack pack," number not more than about 5 whole olives. Alternatively, an individual serving size olive container contains olives that number not more than 6, or 8, 10, 12, 15, 20 or 25 olives. Alternatively, the olives that are contained in the individual serving size olive preparations weigh about (or not more than about) 1.0 ounces, 1.5 ounces, 1.6 ounces, 1.8 ounces, 3 ounces, 3.5 ounces, or 4.2 ounces. Alternatively still, the individual serving size packaged olives can be packaged in containers having liquid volume capacities of not greater than, for example, 2.0, 2.5, 3.0, 3.5, 4.0 or 5.0 fluid ounces.

Figure 3A:
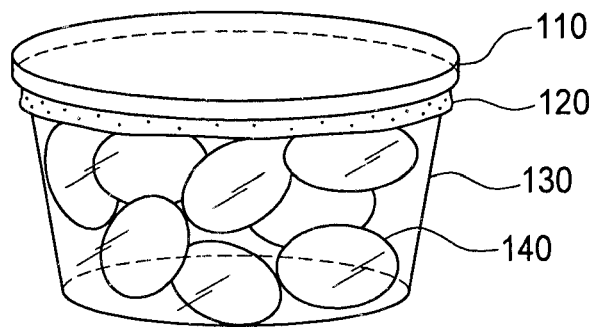
FIGS. 3A through 3C provide illustrations of embodiments of the olive preparation of the invention that are packaged in individual serving cups.
Figure 3B:
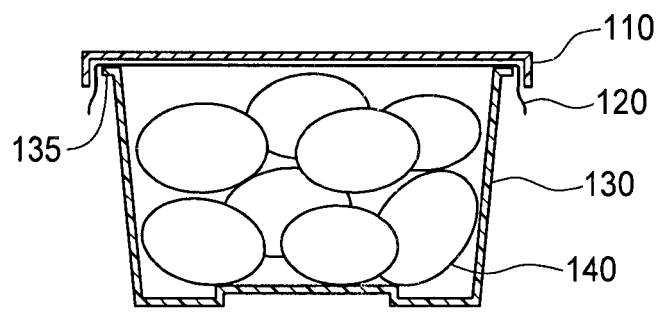
Figure 3C:
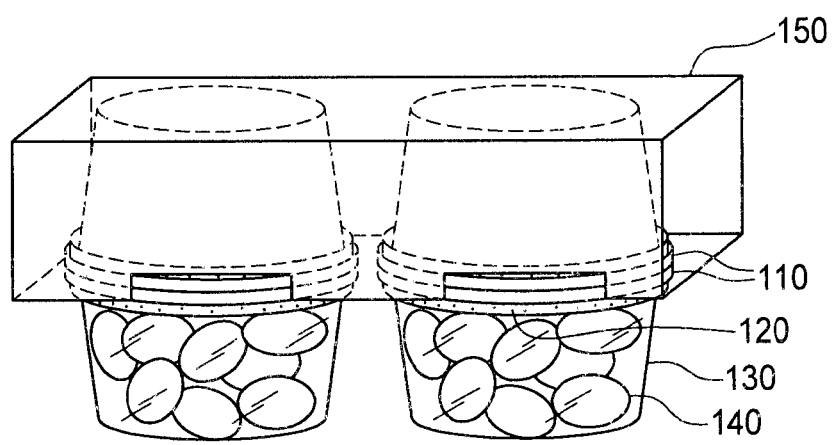

Embodiments of the invention for a snack-size individual serving of an olive preparation of the invention are shown in FIGS. 3A through 3C. In each of these figures, the olives are packaged in a plastic cup 130 where each cup is packaged with approximately 1.6 ounces (45 grams) by weight of olives. FIG. 3A provides an illustration showing a view of a single individual serving cup. This single serving cup 130 contains olives 140, where the cup is free of any free flowing liquid, e.g., liquid brine. The cup 130 is sealed with a thin foil or plastic lidding material 120 that is attached to the lip of the cup 135 using a suitable adhesive. The embodiment shown in FIG. 3A further comprises an optional plastic overlid 110 that can be used to reseal the container 130 after the thin lidding material 120 is removed.

FIG. 3B provides a longitudinal cross section of the individual serving cup of FIG. 3A. As can be seen in this figure, but is obscured in FIG. 3A, the lidding material 120 is tightly associated with the plastic cup 130 around the circumference of the cup along the lip of the cup 135, resulting in a sealed cup after application of the lidding material 120. As shown is FIG. 3B, the overlid 110 lies on top of the lidding material 120, and is closely associated with the cup 130, and specifically the lip of the cup 135. After removal of the lidding material 120 from the cup 130, the overlid 110 can be reapplied to again seal the cup 130.

FIG. 3C provides an illustration view of a "multi-pack" comprising four individual serving cups 130 packaged as a single unit for commercial sale. Each cup 130 in the multipack is sealed with a lidding material 120, and optionally further has an overlid 110 that can be used to reseal the cup 130 after removal of the lidding material 120. In one embodiment as shown here, the four cups in the multipack are held together by an exterior wrapping (packaging) 150 that can be of any material or configuration, for example but not limited to cardboard or plastic. The exterior wrapping 150 may or may not comprise coloring, insignia, logos, trademarks, decoration, adornment or any type of writing such as manufacturer's information, description of the cup contents, nutrition information, volume or weight measures. The lidding material 120 on its outer face can also contain such information.

In other embodiments, containers used in packaging the olive preparations of the invention can also advantageously be any size larger than single serving size. For example, larger olive preparations in sealed containers can be about 6 ounces, 8 ounces, 12 ounces, pint size containers or quart size containers. In some embodiments, these larger olive preparations can be packaged in rigid or semi-rigid plastic containers, or any other type of containers, for example, in cans or in glass jars. These larger container sizes can also comprise a foil or plastic lidding material as well as an optional resealable overlid or cover.

In some embodiments, the containers used for the packaged olive preparations of the invention are sealed trays or sealed platters of olives. These sealed trays are convenient for serving the olives directly from the tray containers, for example, at dinners, social events, restaurant salad bars or delicatessens. In some embodiments, the sealable containers are 9 inch×11 inch×3 inch deep trays for institutional use. The tray or platter containers used for these larger packaging sizes can comprise aesthetically pleasing design elements that make them attractive for display at dinners, social events, restaurants, or delicatessens. For example, the trays or platters can be different colors or shapes, or be decorated with holiday theme ornamentation. When large size containers of packaged olive preparations of the invention are to be displayed, for example at a supermarket olive bar or in a restaurant, those containers can also contain design elements that make them aesthetically pleasing. In some aspects, the larger size packaging options of the invention can find use in restaurant kitchens, schools, hospitals or any other places where food preparation is done.

In some aspects, the invention provides olive preparations that are shelf stable for advantageous periods of time, i.e., the olive preparations have a useful shelf life. In some aspects, the olive preparations of the invention preferably have a shelf life of at least 12 months, or more preferably, at least 24 months. That is to say, the packaged olives are "shelf stable" for at least that length of time. In some aspects, the packaged olives of the invention can have a shelf life of any value between 12 and 24 months. In some aspects, the olive preparations of the invention are shelf stable for at least 12 months, and preferably longer, for example, for at least 16 months, 18 months, 20 months, or 24 months, or any length of time between 18 and 24 months. To obtain this shelf life, the olive preparations can be treated in any of a variety of ways known in the art, for example, by heat treating such as retort processing, removing or reducing the oxygen concentration in the sealed containers and utilizing packaging containers that provide an oxygen barrier.

In some aspects, sealing the olive preparations in a minimized-oxygen (e.g., substantially oxygen-free or reduced-oxygen) environment can promote shelf life, reduce spoilage and preserve the intended flavors and other organoleptic properties of the olives. Oxygen can potentially result in oxidation of the fat component of the olive leading to rancidity and off flavors. Reducing the oxygen within the sealed containers can be accomplished using any of a variety of methods known in the art, including but not limited to packing under vacuum conditions, packing under nitrogen gas, packaging following nitrogen gas flushes, nitrogen flushes in combination with vacuum application, or use of oxygen scrubbers.

The containers used to package the olive preparations of the invention optimally provide an oxygen barrier between the olives that are sealed in the container and the outside environment, thereby preventing the ingress of oxygen from ambient air after packaging and sealing the containers.

In some embodiments of the invention, the sealed container comprising the olives is characterized by an oxygen concentration not greater than about 2.0%, or alternatively, not greater than about 1.5%, not greater than about 1.0%, not greater than about 0.5%, not greater than about 0.1% or not greater than about 0.05%. Alternatively still, a sealed container comprising the olives is characterized by an oxygen concentration in the range of 0.05% to 1.0%.

In some embodiments, the olives contained in the olive preparations can advantageously comprise a thin coating of an oil to create an aesthetically pleasing sheen on the surface of the olives. Oils such as olive oil and sunflower oil can be used, and winterized olive oil or pure olive oil are the most preferred forms of olive oil. It is not intended that the invention be limited to the use of these oils as shine-agents, because one of skill will recognize that other oils and shine agents can readily be used, including combinations of different oils or agents. In some embodiments, when olive oil is used, the oil can be applied to the olives in a diluted form and/or in a minimal required volume. Minimal volume can be, for example, in a concentration of about 0.2% by weight of the olives being coated, or in a range between 0.20-0.35%. The oil is applied to the surface of the olives in a minimal smallest possible volume taking into account such factors as (i) there is no substantially free flowing liquid oil in the container when packaged, (ii) the oil imparts an aesthetically pleasing sheen on the surface of the olive, and (iii) the oil coating will not leave an excessively oily residue on the finger when an olive is picked up with the fingers and eaten.

V. Co-Packaged Food Items

In some embodiments, the acidified, brineless olive preparations of the invention can include additional co-packaged food items (i.e., food items other than the packaged olive or olive stuffing material). For example, vegetables (for example but not limited to celery, onion, carrot, many types of peppers), cheeses, and nuts (e.g., almonds) can all find use when packaged with the brineless olives to create appealing and more diverse products.

In some embodiments, the packaged olive preparation can be in a food "kit" where a small quantity of the packaged olive preparation of the invention is included with an assemblage of other foods that are sold together to make a snack kit or meal kit. When sold in a kit, the olives in the packaged olive preparation will typically be kept separate and will not physically contact the other food components in the kit, although the components will be assembled together as a single unit. For example, a food kit comprising packaged olives, crackers, cheese and deli meat might be assembled into a kit, where each component is sealed in a different section of a multi-compartmental tray. These types of packaging kit systems can find use, for example, in schools, hospitals and in airline food service.

VI. Heat Treating and Retort Processing

The packaged olive preparations of invention can optionally be heat treated. Furthermore, the methods of the invention used to produce packaged liquid-free acidified olives can optionally employ a heat treatment step after the sealing of the sealed container containing the acidified olives. As used herein, the expression "heat treating," "heat treatment" or similar expressions can encompass a variety of different heat treatment processes. For example, in some aspects, heat treating includes any type of retort processing. For example, retort processing can be sterilization retort processing, where retort temperatures and pressures are great enough to sterilize the olive preparation. In other aspects, the retort processing uses temperatures and pressures that are not sufficient to achieve sterilization, but are sufficient to give the olive preparations a suitably long shelf life, similar to a pasteurization process.

Generally, retort processing is a process for heat treating food products in a manner where the container containing the food product can remain sealed and where the heating and subsequent cooling are done in a controlled manner that causes minimal damage to the organoleptic properties of the food product. Retort processing also preserves the integrity of the food container and maintains the integrity of the seal on the food container. Retort processing generally is a method for heat treating sealed containers where there is an equilibrated environment (i.e., a minimized pressure gradient) between the sealed container interior pressure and the retort internal pressure. The temperate and pressures are regulated in such a way that prevents an adverse impact on seal integrity and "paneling" or distortion of the cup. As the temperature in the retort increases, the internal cup temperature increases causing an internal pressure increase. The overpressure in the retort chamber is gradually increased to match the increasing internal cup pressure. When the heating process is completed, the retort and cup are gradually cooled requiring the overpressure to be gradually decreased as the internal cup pressure decreases with temperature. Particular conditions for the overpressure process are optimized (sometimes empirically) for each particular food product and sealed container. The sealed containers used in the olive preparations can be selected for their properties to provide an oxygen ingress barrier as well as for their ability to withstand retort temperatures.

In some embodiments, the retort processing is an overpressure retort process. When an overpressure retort process is used, the retort program is generally a 13 step process that includes application of heat, application of an optional water spray that comes in contact with the containers within the retort chamber, the introduction of pressurized air to balance the pressure inside the sealed containers with the external pressure in the retort chamber, holding the sealed container at a defined temperature and pressure for a set length of time, and the controlled reduction of the pressure and temperature, with care to maintain the integrity of the sealed container. In some embodiments of the invention, the retort processing used is not an overpressure retort process.

Examples of retort processes finding use with the invention are provided in Example 9 and FIGS. 7A and 7B. It is understood, however, that the invention is not limited to any particular retort conditions, because retort conditions will vary depending on variables such as the volume of olive material to be retorted, and the size, shape and composition of the packaging materials.

In still other embodiments, the packaged olives of the invention are not subjected to retort processing, and alternatively, can be subjected to any suitable sterilization process as known in the industry.

Regardless of what method is chosen for heat treating or otherwise sterilizing the olives, the process is carefully selected and controlled in order to minimize the adverse impact on the organoleptic properties of the packaged olives.

In some aspects, the olive preparations of the invention are not heat treated, for example, are not subjected to retort processing or pasteurization. In some embodiments, the olives are packaged in a sealed container, with no further treatment required. Optionally, heat treated or non-heat treated olive preparations of the invention can be refrigerated after packaging. In some embodiments, refrigeration of non-heat treated olive preparations will result in a sufficient shelf life of the olive product.

VII. Methods for Stuffing Olives

The invention provides compositions and methods for stuffing pitted olives, for example, black ripe olives, which are technically more challenging to stuff because these olives can be more fragile and softer in texture than the green olives that are traditionally used for stuffing. The invention also provides flavored stuffings that can be used to stuff pitted olives. Although these compositions and methods find particular use with black ripe olives, it is not intended that the materials and methods of the invention for olive stuffing be used exclusively with black ripe olives, as these materials and methods can be used equally successfully with other types of olives, e.g., green olives. In some embodiments, these stuffing compositions and methods find use with the acidified, brine-free black ripe olives of the invention.

Novel approaches were developed for olive stuffing. These methods provide various advantages, including expanding available flavor options for stuffings, especially with regard to flavors that will complement black-ripe olives, optimizing olive stuffing methodology for black ripe olives, and development of automated, high-throughput methods for olive stuffing. These methods for stuffing olives use a viscous paste to form the stuffing material, where the viscous paste is extruded then hardened. These olive stuffing methods can optionally use a novel flavor formulation described herein; e.g., see Examples 10, 11 and 12.

Method 1) Pre-Stuffing Paste Solidification

Figure 4:
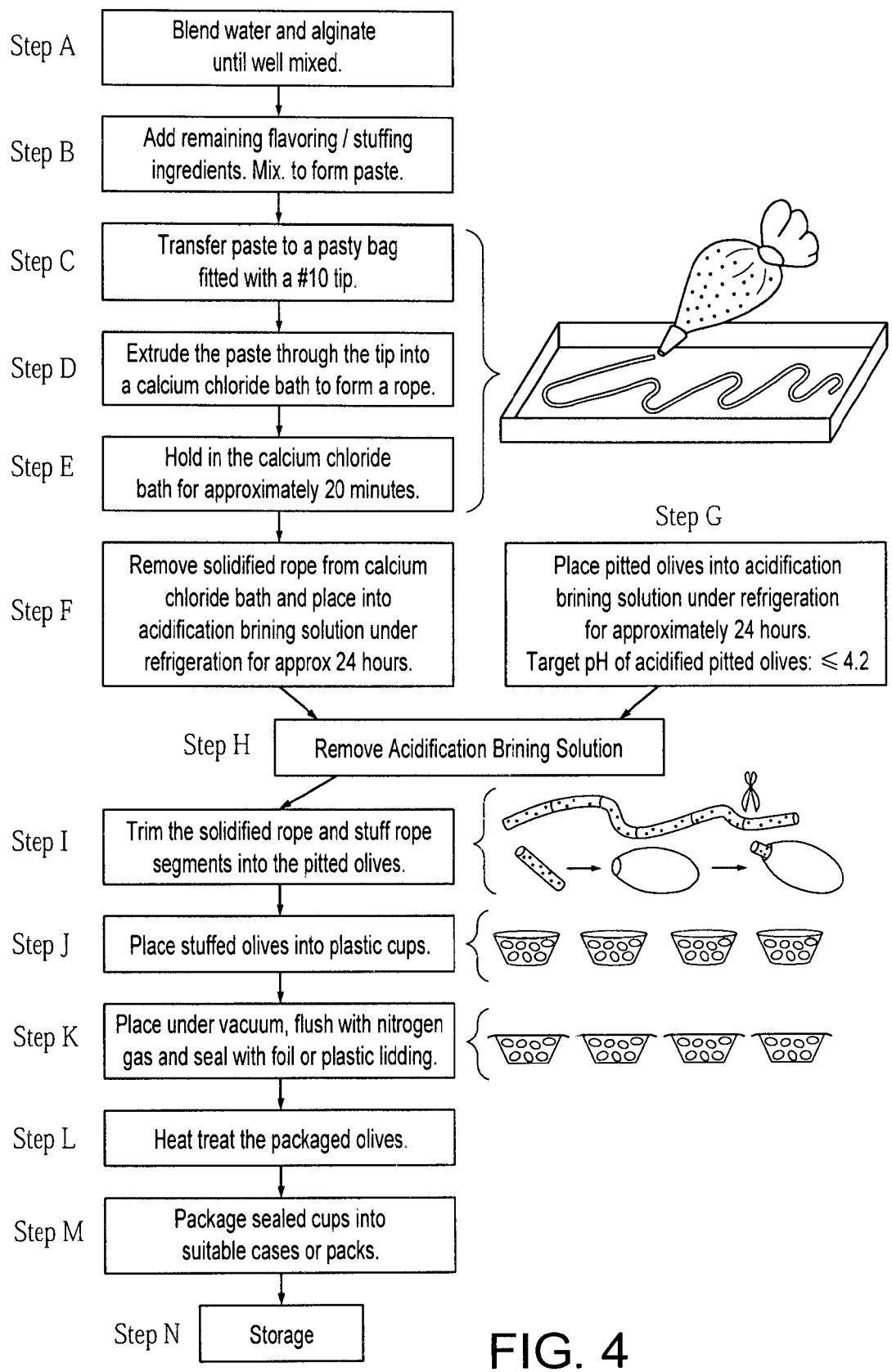
FIG. 4 provides an illustration of a small scale production method for producing stuffed olives using a paste with pre-insertion solidification of the paste.

A first approach to developing the stuffing protocols uses a viscous stuffing paste that is hardened prior to insertion into the pitted olives. This small scale laboratory method is illustrated in FIG. 4. The paste (step B) is formed from approximately 67.4% water, 30% flavored puree (i.e., flavoring ingredients), and 2.6% gum blend. These ratios are approximate, as the exact percentages used are adjusted when different flavoring purees are used, in order the optimize the viscosity and gelling properties of the paste. See Examples 11 and 12 for examples of flavored pastes that can be used, although it is not intended that that use of these methods be limited to any particular flavored paste herein, as any suitable flavored paste mixture can be used.

The resulting paste containing these three components is extruded to produce long strings (also referred to as "ropes" or "snakes") in a calcium chloride bath (Step C). The viscosity of the starting paste can be adjusted for optimizing the formation of the strings. In the presence of the calcium chloride, the strings harden, and are then trimmed into smaller lengths of suitable size, and then inserted into pitted olives (step I).

This method was marginally successful when tested and optimized at the bench-top scale. However, the method has technical limitations, and would likely be problematic in the event that scaled-up production was attempted to meet production requirements for large commercial demand. This approach was is a successful proof-of-principle for being able to use a paste type stuffing, but was not pursed further.

Method 2) Direct Injection, Post-Stuffing Paste Solidification (Laboratory Scale)

Figure 5:
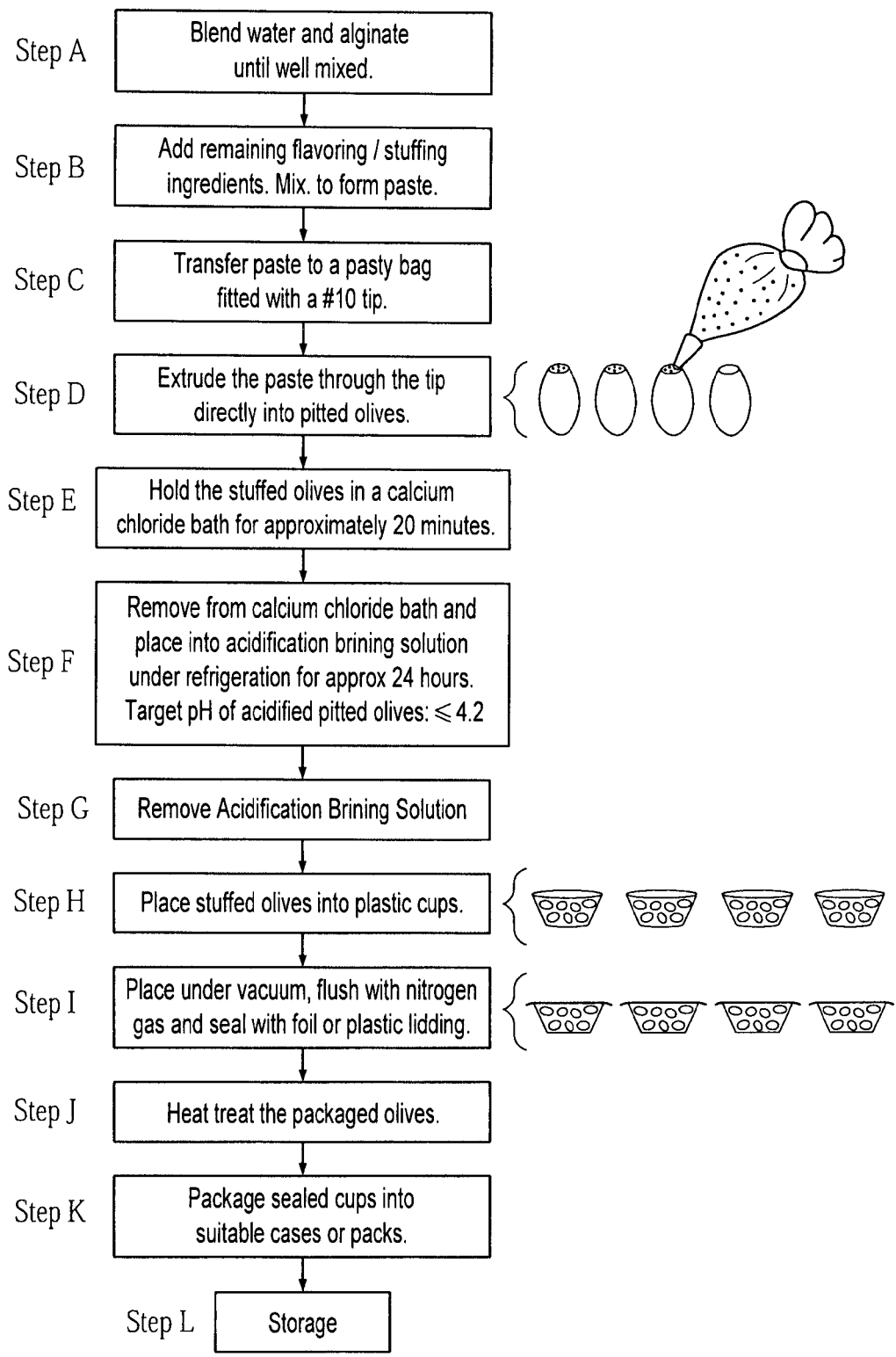
FIG. 5 provides an illustration of a small scale production method for producing stuffed olives using a paste with direct injection of the paste into the olive followed by post-injection solidification of the paste.

A preferred alternative stuffing method was also developed for small scale laboratory testing, and is provided herein, as depicted in FIG. 5, and is described in detail in Example 6. In this protocol, the flavored paste, which can be similar or identical to the pastes described above, are injected directly into the pitted olive, and allowed to solidify in situ in the olive, that is to say, within the olive pit cavity.

In this method, a flavored stuffing paste of the same type as described above is formed from water, approximately 30% flavored puree, and approximately 1% to 5% sodium alginate (step B). Guar gum and/or xanthan gum and/or a gum blends can also be optionally included to adjust the viscosity and solidification properties of the paste as needed. For example, when different flavoring ingredients are used to form the paste, the resulting pastes may have differing properties with respect to viscosity and solidification, necessitating adjustments in the paste recipe.

The paste thus formed is injected directly into the pitted olives, which in some embodiments are un-acidified and have a pH of approximately between 7.5 and 8.5 (FIG. 5, step D). In some aspects of the method, the pitted olives are pre-acidified black-ripe olives of the invention. In other aspects, the pitted olives are black-ripe olives that are not yet acidified, where the un-acidified olives have a pH of approximately between 7.5 and 8.5.

In bench top experiments, the paste is injected into the pitted olives using a pastry bag (FIG. 5, step D). Following injection, the stuffed olives are placed in a calcium chloride solution (step E) which hardens the injected paste filling.

In some embodiments, the injected olives are exposed to a single calcium chloride bath having a calcium chloride concentration of anywhere between 3% and 10% by weight. The stuffed olives are soaked for an adequate amount of time for the injected paste to harden, which may be between one minute and over one hour.

In alternative embodiments, the injected olives are exposed to a two-step calcium chloride treatment, where the first calcium chloride bath has a high concentration of calcium chloride, for example, between 5% and 10% for a relatively short time, for example, not more than about two minutes, and typically close to one minute. Following this first bath, the stuffed olives are then transferred to a second bath having a lower concentration of calcium chloride, for example, between 0.25% and 1.00% for a relatively longer time, for example, between 12 and 24 hours. In the two-step bath method, the initial high concentration calcium chloride bath acts to quickly form a solidified paste cap on the end of the olive (i.e., the end exposed to the calcium chloride bath) while the interior of the stuffing remains viscous. This rapid solidification capping prevents the liquid stuffing paste on the interior from running out of the olive. After the cap is formed, the olives are then transferred to the lower concentration calcium chloride bath where they can remain for a longer time to fully solidify the injected paste. This two step process eliminates or reduces the bitter taste that results when olives have been soaked for long periods of time in the high concentrations of calcium chloride.

In some embodiments that employ a two step (high/low) calcium bath method, the second calcium bath (low concentration calcium) is concurrent with the acidification brining step (step F), where the acidification brining solution also comprises the low concentration of calcium chloride. Thus, the olive is simultaneously acidified while the injected stuffing paste undergoes complete hardening.

In other aspects, the pitted olive to be stuffed is fully or partially pre-acidified by pretreatment in an acidic brining solution prior to the paste injection step (FIG. 5, step D). This gives the advantage of eliminating or reducing the time that the stuffed olive needs spend in an acidification brine solution after being stuffed with a paste. However, such olives will still need to be exposed to a calcium bath in order to harden/gel the paste.

In still other alternative embodiments, the flavored paste that is used to stuff a neutral pH pitted olive further comprises a calcium salt that is insoluble at neutral pH values, but is water soluble in acidic conditions. The presence of the calcium salt in the paste will cause the solidification/gelling of the paste only when exposed to acidic conditions. In this case, neutral pH olives are stuffed with the neutral pH paste, and then transferred to the acidification brining solution, where the decrease in pH solubilizes the calcium salt in the paste, thereby causing the paste to solidify.

VIII. Large Scale, High Capacity Methods for Stuffing and Acidifying Olives

Figure 6:
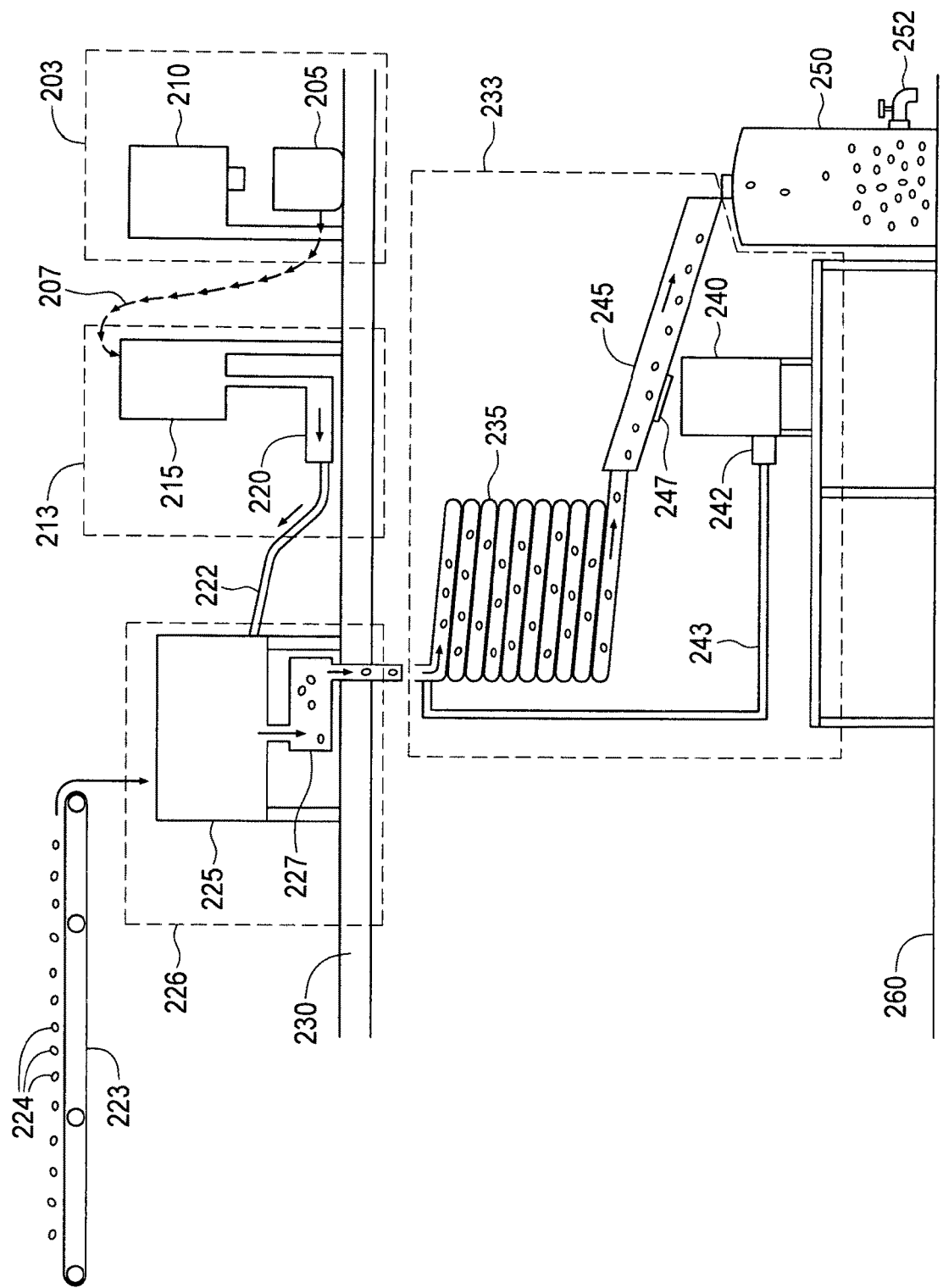
FIG. 6 provides an illustration of a large scale, high speed apparatus for high volume production of stuffed olives using a paste injection into the olive followed by post-injection solidification of the paste.

A most preferred method and apparatus for olive stuffing was developed for large scale, high volume olive production, and is described herein. An apparatus for use in large scale production of stuffed acidified olives is shown in FIG. 6. In this most preferred aspect, the olives are stuffed and acidified in a manner that is identical in theory to the laboratory scale in situ solidification methods of FIGS. 2 and 5, described above, except with modifications to permit the use of automated machinery to produce large quantities of stuffed olives sufficient to meet the demands of commercial production.

FIG. 6 shows an apparatus for the large scale production of stuffed acidified olives. The apparatus consists essentially of five components. These are paste mixer assembly 203, the paste feeder assembly 213, the pitting and stuffing assembly 226, the calcium dwell assembly 233 and an acidification brining tank 250.

The first step in the process of olive stuffing is preparing the stuffing paste. The formulation of the paste used for high volume olive stuffing is as described above in the laboratory scale methodologies. In one embodiment, a large paste mixer 210 is used, where all of the ingredients for preparing the viscous stuffing paste are combined in a mixing vessel 205, and further where mixing blades are attached to and controlled by the mixer 210, and where the blades can be raised and lowered into the mixing vessel 205. The paste mixer 201 and vessel 205 can be of any size and design, for example, as might be used for commercial food preparation. In one embodiment, a Hobart Model M802 mixer and matching mixing vessel are used to prepare the stuffing. In some embodiments, the pastes are optimally prepared in apparatus that are designed to prepare bread dough, as those types of machinery are better suited to mix the stuffing dough than apparatus that are designed to blend liquids. As shown in FIG. 6, the apparatus comprises a mixer assembly, where in this one embodiment depicted, the assembly comprises the mixer 210 and the vessel 205. However, it is not intended that the invention be limited to any particular mixing devices, nor limited to any particular size or capacity of the device. The mixer assembly can be any device or combination of devices that serves the purpose of combining the paste ingredients to produce the stuffing paste. Collectively, in this one embodiment, the paste mixer 210 and paste vessel 205 make up the paste mixer assembly 203.

The arrows 207 indicate the means by which the paste is transferred from the paste mixer assembly 203 (more specifically here, the mixing vessel 205) to the paste feeder assembly 213. In some embodiments, the transfer is manual, that is to say, the contents of the vessel 205 are carried or poured into the paste feeder 215. In other embodiments, the paste can be transferred from the vessel 205 to the paste feeder 215 by any automated route, for example, by flexible tubing or rigid piping, or a conveyor belt type of mechanism. The feeder 215 controls the delivery of the paste into the paste injection pump 220. In some embodiments, the paste feeder 215 is the kind of device designed to grind meat or fill sausage links, for example, the Vemag Robot HP-15S. Collectively, in this one embodiment, the paste feeder 215 and paste injection pump 220 are the components of the paste feeder assembly 213. However, it is not intended that the apparatus be limited to any particular design, model or size of the feeder 215 or pump 220, and other designs and equipment can be used.

The next step in production takes place at the pitting and stuffing assembly 226. Central to this assembly is the pitter and stuffer 225. This pitter and stuffer receives unpitted olives 224 that are delivered by an olive feed conveyor system 223. The pitter and stuffer also receives paste that is delivered by the paste injection pump 220 through paste transfer conduit 222. In this one embodiment, the pitter and stuffer is an OFM Food Machinery pitter and stuffer Model DR146. After pitting and stuffing, the stuffed olives pass through a water spray wash station 227 in order to remove any broken olives, scraps of olive meat, and excess or stray stuffing that is sticking to the olive or protruding from the olive pit cavity.

After the olives emerge from the spray wash station 227, they are delivered by gravity flow to the calcium dwell assembly 233. This assembly 233 comprises the calcium dwell coil 235, olive flume 245, solution removal sieve 247, calcium solution reservoir 240, calcium solution circulation pump 242, and calcium solution conduit 243. From the spray wash station 227, the olives fall into spiral coiled tubing, the calcium dwell coil 235, that contains a gravity flow of a calcium chloride solution, typically a high concentration calcium solution (5-10% calcium chloride). This calcium solution serves to initiate the paste hardening in the pitted olive. The calcium solution is delivered to the top of the tubing coil by the calcium solution circulation pump 242 through the calcium solution conduit 243. The length of time that the olives are exposed to the high concentration calcium solution in the dwell coil can be regulated by the geometry of the coil 235. For example, the dwell time of the olives in the coil can be regulated by changing the steepness of the coil, the length of the coil, the diameter of the coil, and the volume of calcium solution flowing through the coil. In one embodiment, a coil with a four inch diameter is used, although other diameter coils can alternatively be used. In one embodiment, the dwell time of the stuffed olive in the dwell coil is approximately one minute.

When the olives exit the dwell coil 235, they travel down a flume 245 by gravity flow, and ultimately are channeled into an acidification brining tank 250 holding acidification brining solution. When part way down the flume, the olive and calcium solution stream passes over a solution removal sieve 247, consisting essentially of a course mesh that permits the olives to move past and continue down the flume to reach the brining tank 250, but where the mesh of the sieve 247 diverts the flow of the calcium solution downward out of the flume and into the calcium solution reservoir 240. From the reservoir 240, the calcium solution is recycled back up to the top of the dwell coil 235 by the calcium solution pump 242 and conduit 243.

After delivery to the acidification brining tank 250, the olives are allowed to soak for a suitable time, for example, 12-24 hours at room temperate. Although the brining takes place at room temperature, the tank 250 can be heated or cooled as necessary during the treatment in order to compensate for excessively cold or excessively warm ambient air, as might be expected periodically during winter and summer seasons. A relatively constant temperature from batch to batch of olive acidification helps to maintain product consistency across the multiple batches.

In some embodiments, the acidification brine also contains a dilute concentration of calcium chloride, for example, between 0.25% and 1.00%, for the continued hardening of the injected paste. In some embodiments, the acidic brining solution can also contain liquid flavorings for flavor infusions into the olives.

At the end of the acidification brining step, the brine is drained from the tank 150 through a drain valve 252, which is designed to permit the passage of the liquid brine, but does not permit the olives to pass through the drain valve 252. From the tank 150, the drained brine-free acidified olives are then packaged and sealed into suitable containers.

The paste mixer assembly 203, the paste feeder assembly 213, the pitting and stuffing assembly 226 can optionally be located on a upper processing deck 230 that is located above the lower processing deck 260 that contains the calcium dwell assembly 233 and acidification brining tank 250. This arrangement will permit the use of gravity flow in order to deliver the olives through the dwell coil, flume and ultimately to the acidification brining tank.

Use of this high capacity apparatus was successful in trial runs with a pizza stuffing, black-ripe olives, pizza flavor infusions, and a two-step calcium chloride exposure using the recipes as shown in Example 11.

IX. Novel Flavored Stuffings

The invention provides flavored stuffings that find use in methods for making stuffed olives. As described above, the stuffing methods of the invention use an injectable paste technique where a flavored viscous paste is injected directly into a pitted olive, where it is then hardened by exposure to calcium chloride.

The flavored pastes are formed by combining flavored purees with thickening agents such as sodium alginate, guar gum and/or xanthan gum, which can be hardened upon exposure to calcium chloride. Experiments were undertaken to develop new stuffing flavors and flavor combinations, and furthermore, to develop stuffings that complement the flavor of black ripe olives. Successful trial experiments were conducted using pizza flavored pastes and red bell pepper (sweet pepper) flavored pastes, thereby providing a proof-of-principle for the methodology. These two recipes are shown in Examples 11 and 12.

X. Olives with Infused Flavorings

The invention provides packaged olive preparations that can optionally be flavored by infused flavorings. In some aspects, the olives in these flavored preparations can be whole or pitted, or segmented in any way. In some aspects, if the olives are pitted, they may or may not be stuffed, as either whole or pitted olives can be infused with flavorings. In some embodiments, if stuffed olives are further infused with flavorings, the infused flavorings are chosen to complement any flavorings that may already exist in the olive stuffing.

In some embodiments where an olive is both stuffed and infused with flavoring, the stuffing in the olive may contain little or no flavoring of its own, and all the flavor in the stuffed olive comes from the infused flavorings.

In some embodiments where an olive is stuffed, one or more infused flavorings of the same nature or type as the flavoring of the stuffing is used in order to augment or boost the flavor of the stuffed olives. In other embodiments, the infused flavorings are of a different nature or type than any flavoring that may come from the olive stuffing. Typically, but not exclusively, multiple infused flavorings are used in combination in an infused flavoring treatment. The invention is not limited to any type of infused flavorings. A wide variety of liquid flavor infusion extracts are commercially available from various manufacturers.

When infused flavorings are used, the infusion step can take place, for example but not limited to, concurrent with the acidification step prior to packaging. That is to say, any desired flavoring can be added to the acidification brine solution. Because the olive preparations of the invention are packaged without brine or other free liquid, the flavor infusions (typically in liquid form) must take place before the packing step. The length of soaking time to achieve a desired flavor concentration from the flavor infusions will vary according to the flavorings used, and is determined empirically. Typically, the olives are soaked for 12-24 hours (with the acidification brining treatment) to achieve a suitable flavor density, and typically, the flavorings are included in the acidification brining step.

In some aspects, the flavor infusions are done using liquid flavoring extracts that are commercially available. In other aspects, infused flavorings can be achieved during a soaking step by using non-liquid spice treatments. These non-liquid spices are typically dried, minced, diced, flakes or powder forms. Flavors from these non-liquid spices will diffuse during the pre-packaging soaking step, and can impart an infused flavoring to the olives prior to the liquid-free packaging. For example, spices such as oregano, basil, chili power, black pepper, hot pepper flakes, onion powder, garlic powder and minced garlic can be used in this manner. Alternatively still, the spice can be fresh, i.e., not dried. A spice treatment soaking step can take place in an additional treatment step at any point prior to packaging, or alternatively, can be included with the acidification brining ingredients during the acidification step.

In other aspects, the packaged olive preparations of the invention can be flavored or spiced with co-packaged non-liquid spice treatments. These spices, as described above, do not add any liquid volume to the liquid-free packaged olive preparations of the invention. Any of these types of spices can be included in the packaged olive preparations of the invention.

Examples of infused flavorings are provided in Examples 10 and 11.

EXAMPLES

The following examples are offered to illustrate, but not limit, the claimed invention. It is understood that various modifications of minor nature or substitutions with substantially similar reagents or components will be recognizable to persons skilled in the art, and these modifications or substitutions are intended to be included within the spirit and purview of this application and within the scope of the appended claims.

Example 1

Traditional Protocol for Production of California Style Black Ripe Olives

This example describes the traditional protocol for producing Cakliformai style black ripe olives. The protocol is illustrated in FIG. 1. California olives were harvested and shipped to a production facility by truck in bins that typically held one half of one ton each. The olives that were used varied in size and varietal, where manzanillo and sevillano were the predominant varietals. Other varietals, such as Manzanilla fina have also been successfully used and may also be incorporated.

The olive harvest season in Northern California in the vicinity of the production facility starts at the end of September and can last until the end of November. Because it is not possible to process all the olives received during this time period, most of the olives were stored in storage tanks containing diluted vinegar (resulting 1%-2% acetic acid, pH 3-4). The storage tanks had a capacity of 40 tons each, and approximately 1400 tanks are located at the facility. The olives in the storage tanks were able to last up to two years.

When olives were ready to be processed, they were transferred from the storage tanks to the processing tanks, which hold about 12 tons of olives each. The treatment process begins with lye-curing by adding a solution of approximately 0.8 to 2.5% by weight sodium hydroxide, known as lye or caustic soda. This treatment with lye is the step that debitters the olive by neutralizing the oleuropein compounds in the olive flesh. The lye curing required four stages, or soakings, each soaking lasting approximately 3-12 hours. Between each stage is approximately a 12 to 18 hour delay where the olives were bubbled with air in water. The goal of the first lye soak or "cut" was to barely penetrate the olive. In order to see if the lye has "cut" the olive, a sample of olives was retrieved from the tank in which they were being soaked, and the individual olives were cut in half. A solution of phenolphthalein, a colorimetic pH indicator, was applied to the cut olives. Phenolphthalein is colorless in acidic solutions and pink, red or violet in basic conditions, depending on the concentration of the phenolphthalein. If the lye has penetrated the olive flesh, the flesh will turn red when exposed to the indicator. Depending on the percentage of olives containing red and the amount and depth of red in each individual olive, the processors were able to assess if the olive is finished with the first lye cut. Based on this assessment, if the lye treatment in the first cut was finished, the lye was drained from the olives, the tanks were filled with water and bubbled with air overnight.

If the first lye cut was not finished, the soakings were continued and the process repeated. This cutting process was repeated typically four times, using varying times for soaking and different lye concentrations ranging from 0.8 to 2.5% NaOH, until the lye had completely soaked through to the pit of the olive with just the right degree of penetration and concentration. Great care is taken to monitor this cutting process, otherwise the olive flesh may be damaged and become very soft or will be "burned" by the treatments.

Following the lye curing and rinsing, the olives were treated in order to turn the olive flesh a black color. This treatment used ferrous gluconate, which turns the olive flesh black by an oxidation process when the olives have a pH of approximately 8.6 to 8.9. The lye cutting from the previous step leaves the olives very basic with a high pH, which needs to be lowered to approximately 8.6 to 8.9 in order for the ferrous gluconate treatment to be effective. This was done by bubbling $CO_2$ gas through the water solution containing the olives. The $CO_2$ naturally creates carboxyl acid, thereby lowering the pH of the olives. $CO_2$ was bubbled through the water until the olive flesh had the desired pH. At this point, the olives were rinsed one additional time, and the ferrous gluconate was added, quickly turning the olives black.

After the coloring step, the olives were washed, transferred to a neutral brine solution (pH 7.0), and prepared for packing. These traditional California style black ripe olives thus produced were packed in cans or jars in the neutral brine packing solution and then heat treated, typically using a retort sterilization to approximately 250-260° F. These olives are considered a low acid food product. The whole process from start to finish took about seven days.

Example 2

Traditional Protocol for Production of California Style Green Olives

Traditional California style (non-fermented) green olives were produced using a method essentially as described above for the California style black ripe olives, with the exception of omitting the ferrous gluconate treatment steps. Thus, after the lye treatment and water wash step, the still-green olives are kept submerged to minimize blackening from oxidation in ambient air, and from there, transferred to a neutral brine solution for packaging in the same way as the California style black ripe olives.

Example 3

Protocol for the Production of Acidified and Brineless California Style Black Ripe Olives This example describes an embodiment of a method of the invention for the production of acidified and brineless California style black olives. In an effort to produce California style black ripe olives that have an acidified olive flesh and permit brineless packaging, various methods were attempted and numerous reagents were tested for suitability for use in this processing method. The protocol for producing the acidified and brineless olives is depicted generally in FIG. 2.

Initially, attempts were made to acidify the black ripe olives after the ferrous gluconate blackening step. These experiments introduced various acid components into the final brining step in order to acidify the olive flesh, preferably to a pH below about 4.6. It was noted that the olives that were blackened during the ferrous gluconate treatment lost some or all of their black coloring during the acidification. As a result, it was decided to try other oxidizing agents as alternatives to using ferrous gluconate.

Ferrous lactate was tested as an alternative oxidizing agent. It was noted that the olives that were treated with ferrous lactate retained their black color better, i.e., did not fade to such a significant degree, compared to olives blackened with ferrous gluconate. It was also noted that the olives colored with ferrous lactate obtained their black color faster than olives colored with ferrous gluconate. From this point forward, the olive darkening was done using ferrous lactate. Further attempts at acidifying the olives were then made.

The next step was to acidify the olives to a pH below 4.6 and heat treat the samples. Lactic acid was first used in order to bring down the pH using olives that were blackened with ferrous lactate. The acidification process included submerging the olives in 14° salinity brine along with the lactic acid. Percentages of 1, 1.25 and 2% by weight lactic acid were used to acidify the olives. Although effective in lowering the pH of the olives, the lactic acid caused the olives to be too sour and bitter in taste.

In the next attempts, glucono-delta-lactone (GDL) was added to the lactic acid brining solution to treat the olives. GDL is a naturally-occurring food additive commonly used in pickling in order to mask bitter aftertastes, and can also contribute to lowering the pH. A brining solution containing a combination of lactic acid and GDL was determined to bring down the pH of the olives to below 4.5, and to reduce the bitter acidic aftertaste of the olives. As the experiment progressed, it was determined that the best olive to brine weight ratio was 1:1.

With additional experimentation, the acidification conditions were optimized by replacing the GDL with 0.4% citric acid. Citric acid is a well established food additive that can mask bitter tastes. This combination of lactic acid and citric acid in the brining solution was more effective than the lactic acid-GDL combination because the lactic acid and citric acid combination reduced the pH of the olives at a faster rate. Procedures going forward from this point generally used ferrous lactate in the oxidation blackening step, and used either lactic acid alone or the combination of lactic acid and citric acid to acidify the olives. In continuing experimentation, other food acidulants were also found to be effective at reducing the pH of the olives to at least about pH 4.6, including adipic acid and malic acid.

Following the olive acidification, the olives were removed from the acidification brine, packaged in sealed containers in the absence of any free liquid brine, and heat treated.

Example 4

Development of Stuffing Flavors

Experiments were undertaken to develop new olive stuffing techniques, flavors and flavor combinations. These stuffing methods and flavors can be used with any olives, although were optimized to be used with California black ripe olives, and in particular, the acidic brine-free olives of the present invention. This example describes the development of stuffing formulations and methods, flavoring purees and flavored stuffing pastes.

During the first phase of development, acidified black ripe olives were stuffed with various actual ingredients to determine what types of flavors will pair well with the olives. Initial experimentation tested over 60 ingredients for taste appeal and feasibility, including but not limited to fruits, vegetables, meats, candies, nuts, cheeses, various pastas, peppers, and cereals. Even though many of these test ingredients had good taste and texture properties, most were aesthetically unappealing and would have faced challenges in production and consumer appeal. Furthermore, few if any could have been produced in a cost effective manner on a large scale.

Flavored ribbons were also considered in developing more diverse flavoring/stuffing options. Ribbons are sheets of solid (but flexible) flavored/colored food material that can be cut/trimmed into suitable sizes to stuff into a pitted olive. Flavored ribbons, such as pimento ribbons, are commonly used in the industry. The available selection of flavored ribbons in the industry is limited, and furthermore, the available ribbon flavors did not pair well with black ripe olives. Attempts were made to produce novel flavored ribbons using guar gum and sodium alginate. For various technical reasons, it was concluded that the ribbons approach would not be commercially viable, and was no longer used.

Alternative methods were developed for stuffing olives, where the methods used an extrudeable viscous paste to form the stuffing material. The paste contained water, sodium alginate, and a flavored puree, and optionally contained guar gum, a gum blend or xanthan gum. These gums and alginate are gelling agents, and solidify when exposed to calcium chloride.

Two different protocols were considered for using the flavored pastes. The first was the formation of stuffing strings that were formed by loading the paste into a pastry bag and delivering long strings of paste directly into a calcium chloride bath, where they harden. These strings were then cut into short lengths and used to stuff the olives. This is the pre-stuffing solidification method, and is shown in FIG. 4. Although successful on the bench top to prove viability of using a stuffing paste, this strings method was not considered for scale up for high volume production.

In a preferred variation of this method, the flavored paste is injected directly into the pitted olive, and the stuffed olive is then submerged in a calcium chloride bath to harden the viscous paste filling. This is the direct injection, post-stuffing solidification method, and is shown in FIG. 5.

Initially, single flavors were produced in order to refine the puree and paste production method and stuffing conditions. The first two flavors were pimento and red jalapeno. These flavored purees were used to produce the corresponding flavored pastes to form the stuffed olives. The hardened strings method (FIG. 4) and the direct injection method (FIG. 5) for stuffing the paste were successfully used to stuff the olives using these flavored pastes.

After these initial proof-of-principle experiments to perfect the puree and paste making processes, other more complex flavorings were attempted. Flavors and flavor combinations were selected for development based on their potential to complement the taste and texture black ripe olives, and also for their potential for commercial scale high volume production. Approximately 24 different flavored purees (and corresponding pastes) were made for initial development, including garlic, anchovies, carrots, pizza, red bell pepper, ranch, teriyaki with wasabi, jalapeno with garlic, roasted pepper hummus, nacho cheddar cheese, Bloody Mary mix (without alcohol), jalapeno with nacho cheese, nacho cheese with salsa, beef jerky, sweet and sour sauce, Italian herb, bread and butter, thyme and lemon, BBQ, taco, and pizza, From this initial list, seven were selected as candidates for further development and scale-up consideration. These were red bell pepper, nacho cheese, Italian herb, bread and butter, ranch, pizza, and taco.

A detailed description of the pizza stuffing is described in Example 11 and a detailed description of the red bell pepper stuffing is described in Example 12.

Example 5

Production of Stuffed Olives from Paste Using Pre-Stuffing Solidification

Experiments were undertaken to develop methods for stuffing olives, and in particular, methods for stuffing traditional black ripe olives and methods for stuffing acidic brine-free black ripe olives of the present invention. Although preformed and preflavored ribbons or sheets were commercially available, the available flavor choices were limiting, and their physical properties were not optimal for stuffing black ripe olives on a large commercial scale. Novel approaches were developed to overcome these limitations using viscous pastes to stuff the olives. Two methods were developed.

In one approach developed for initial experimentation, a paste was produced which was then extruded into a calcium bath which hardened the paste. Following hardening, the paste strings were cut into suitable lengths, then the segments were inserted into pitted olives. This is the pre-stuffing solidification method, and is outlined in FIG. 4.

The paste used in this method that formed the material for extrusion was formed from 67.4% water, 30% flavored puree and 2.6% gum blend. The paste containing substantially only these three components was a viscous substance, which was extruded with pastry bags into long continuous strings into a 5% calcium chloride bath. These ropes were soaked in the bath for 25-60 minutes until firm. The strings became firm through the interaction of the gum blend in the paste with the calcium chloride. After firming, the strings were removed from the bath and placed into an acidified brine solution identical or similar to the brining solution used to acidify the black ripe olives, in which the olives are acidified typically to a pH of less than 4.2. The olives and the strings were then removed from the brine and drained. The solidified strings were cut into suitably short segments, and inserted manually into the pitted olives.

This process was deemed less than optimal for commercial high volume scaling, and so an alternative method for stuffing the olives was considered, as described in Example 6.

Example 6

Production of Stuffed Olives from Paste Using Direct Injection with Post-Stuffing Solidification Experiments were undertaken to develop methods for stuffing olives, and in particular, methods for stuffing traditional black ripe olives and methods for stuffing acidic brine-free black ripe olives of the present invention. In a second approach, distinct from that described in Example 5, a paste was produced, which could be injected directly into the cavity of a pitted olive, then hardened in situ. The paste within the olive cavity would solidify prior to end-stage packaging of the olive preparation. This is the direct injection, post-stuffing solidification method, and is shown in FIG. 5. This process was generally favored over the process described in Example 5 and FIG. 4 because it was anticipated that this process is amendable to large scale up for commercial production.

This second approach was more appealing than either the traditional approach of cutting preformed ribbons, or the process described in Example 5 because (i) the flesh of black ripe olives is generally softer and more fragile than the flesh of green olives, so the injection of a soft paste directly into the pitted olive is less likely to result in physical damage to the olive flesh compared to stuffing with a pre-hardened filling, and (ii) solidification of a stuffing after the injection of a paste into the olive cavity has better potential for feasible scale up to high volume production.

Specifically, this method starts with the making of the paste using water, a flavored puree (or any other type of flavoring ingredients), and 1-5% sodium alginate (or other gelling agents such other gums, or combinations of gum gelling agents). The olives used in the initial experiments were California style black ripe olives that would be used to produce acidified and brineless olives according to the methods provided by the invention. These olives had been debittered and blackened but prior to acidification, the paste was injected directly into the pitted olive cavity using pastry bags. The olives containing the viscous paste were then soaked in a 5% calcium chloride bath for approximately 60 minutes. Longer or shorter times can be used. After that time, the stuffed olives were transferred to an acidic brine solution, for acidification to lower the pH. Alternatively, the acidic brine solution also contained calcium, so the stuffed olives could be transferred directly to the acidification brine after the stuffing step, and simultaneously be exposed to calcium to effectuate hardening of the paste.

A variation of this method was developed in order to optimize hardening of the stuffing paste. In this variation, both the paste stuffing and the olives were separately pre-acidified to a pH not greater than 4.2 by soaking in acidified brine prior to injection of the paste into the olive. After injection, the stuffed olives were then transferred to a calcium chloride bath for hardening.

After working with this protocol over time, additional refinements were made, especially with regard to hardening the stuffing paste without compromising the flavor of the stuffing. One significant observation was that guar gum, xanthine gum and/or gum blend can be incorporated into the paste (in addition to the sodium alginate). It was noticed that the ratio of sodium alginate to guar gum was optimally almost 3:1 and that the sodium alginate needs to be of higher gel strength when it bonds together with guar gum. It was also observed that the guar gum/sodium alginate mixture should be added at the end of mixing instead of the beginning of the mixing process.

The use of calcium chloride in the hardening step was also optimized. If too much calcium chloride is allowed to permeate the olive and stuffing, a bitter taste is left in the olives. It was observed that a calcium soaking process having two steps helps to achieve a better result with a less bitter olive. The first soaking step was with a 5% calcium chloride concentration, but for only a short time, typically for only 1 to 2 minutes in the concentrated calcium solution. This first soaking helps in gelling and capping the tip of the stuffing so that the viscous stuffing material will not fall off or run out of the olive. A second calcium soak step is then employed with a reduced calcium concentration (0.25% to 1%) but for a longer period of time, typically 12-24 hours. This allows the remaining unsolidified paste in the pitted olive to slowly solidify without accruing the bitter calcium aftertaste that can occur when higher concentrations of calcium chloride are used.

Several different calcium treatment methods and concentrations were tested. As stated above, alternative approaches that were tested include a single treatment with a high concentration of calcium, or alternatively, step wise treatment where the first treatment is a high concentration of calcium for a short time, followed by a second treatment with a reduced concentration of calcium. Alternatively still, the acidification brine treatment after stuffing can include calcium, eliminating the need to have a separate calcium solution soaking step (typically where the reduced level of calcium in the two step method is included in the acidification brining step).

The optimal concentrations to use for the calcium chloride washes can depend on the particular stuffing recipe, and may have to be determined empirically. For example, it was observed that the optimum concentration of calcium to solidify the red bell pepper stuffing was 0.25%, while the optimal concentration to solidify the pizza stuffing was 0.75%.

Example 7

Optimization of Olive Acidification Conditions

A significant consideration in the development of the acidified black ripe olives of the invention was the compatibility of the acidified olive with the flavored stuffings that can optionally be used with the acidified black ripe olives. It was observed that the use of some acids in the acidification brining step resulted in an undesirable bitter taste (as typically seen with most acidic food additives). If the bitter taste from the acidified olive was too overwhelming, the flavors from the flavored stuffings will be incompatible with the olive, or will be lost altogether and not recognizable. Significant efforts were undertaken to overcome these problems.

These problems were addressed using a multi-prong approach. First, acids that would minimally impart a bitter aftertaste were identified. Second, effective minimum concentrations of the acids had to be determined, where the effective minimum concentration could acidify the olive flesh in the acidification brining step. Third, a wide array of sweetening agents and flavor maskers were employed to identify those that were able to (i) counteract the bitter after tastes from the acidulants, (ii) did not add their own flavor component that would hide or overwhelm the intended flavor of the stuffing, and (iii) did not interfere with the acidification process.

For example, glucono-delta-lactone concentrations as low as 0.2% and as high as 0.8% were tested in combination with citric acid to identify suitable acidulants. In formulating the base brine solution to use in the acidification step, salinities in the range of 12-24° were tested. A wide range of sweeteners and sweetener concentrations were also tested for use in the acidification brine. The sweeteners tested are summarized Table 3 below.

TABLE 3

| Sweeteners Tested | Result |
| --- | --- |
| sucrose (2.0%) | Preferred |
| beet syrup (4%) | Preferred |
| dextrose (15%) | |
| Luo Han Guo | |
| Stevia | |
| Sucralose | |
| honey | |

Similarly, a wide range of masking agents and flavor enhancers were also tested for use with the invention. These are summarized Table 4 below.

TABLE 4

| Masking Agents and Flavor Enhancers Tested | Result |
| --- | --- |
| MSG | Not preferred |
| Smoothenol (Sensient) Natural Masking Liquid | Preferred |
| Ottens Natural Sweetness Enhancer | Preferred |
| OTTENS "Inhibitter" Bitter Blocker with Natural and Artificial Flavors | Eliminated |
| "Natural Flavor Blend;" Flavor Producers | Preferred |
| Bell Flavors Natural Masking Agent | Eliminated |

Example 8

Optimization of Olive Shine Coatings

The invention provides acidified black ripe olives that are packaged without any free liquid. One difficulty with that packing method is that in the absence of liquid, the olives can look dull and wrinkly. To overcome this problem, the olives contained in the olive preparations can advantageously comprise a thin coating of an oil or other shine-imparting ingredient to create an aesthetically pleasing sheen, shine or gloss on the surface of the olives. Experiments were undertaken to optimize the shining of olive preparations.

Selecting the right type of shine-agent (e.g., an oil) and the proper volume and concentration of that agent to use required significant experimentation. Considerations included (i) what is the minimal application to give a shine to the olive, but will not stain the consumer's fingers while holding the olive; (ii) find an oil that does not impart its own taste to the olive preparation, or if the oil does have a taste, find an oil where the taste is not incompatible with the olives, or itself has a pleasing taste; (iii) find an oil that does not have a tendency to turn rancid, especially at warm temperatures; (iv) determine the optimal dilution of the oil that can be used, in order to minimize the absolute amount of oil to be added, and simultaneously minimize the total liquid volume to be added; (v) use an oil that does not have a tendency to crystallize or solidify at cold temperatures. In addition to testing at room temperature, testing evaluations were also conducted after one week treatments at 100° F.

Using these criteria, a large number of options were tested. Table 5 below summarizes a significant amount of experimentation to find suitable shining agents. The conclusion reached after the testing was completed represents an overall conclusion in view of all the factors requiring consideration. If a product is the most preferred option, that does not necessarily mean that it performed the best in all the performance categories. Overall performance was considered.

TABLE 5

| Formulation | Conclusion |
| --- | --- |
| Olive Oil (0.20% by weight) | First most preferred. |
| Olive Oil (0.35%) | Second most preferred. |
| Olive Oil (0.15%) | Not preferred. |
| Canola Oil (0.15%) | |
| Olive Oil (0.05%) | Not preferred. |
| Canola Oil (0.05%) | |
| Duralox ® Natural Antioxidant (0.20%) | |
| Canola Oil (0.20%) | Not preferred. |
| Canola Oil (0.35%) | Not preferred. |
| Sunflower Oil | Not preferred |

Olive oil at a concentration of 0.2% by weight of the olives was selected as the overall best performer considering all the categories. However, in cold environments, olive oil tends to crystallize and look white and/or clumpy, which would leave a very displeasing appearance on the surface of the olives. In view of this limitation, winterized olive oil or purified olive oil is deemed best, because these forms of olive oil are less likely to display crystallization or clumping in cold conditions.

Example 9

Retort Processing

Two retort processes were developed for use with small plastic cup containers with the olive preparations of the invention, as shown in detail in FIGS. 7A and 7B. These cups were lidded with either plastic film or with a foil lidding. These retort processes were conducted in a Surdry/JBT 1400 mm Static Steam Water Spray Retort oven. These two retort processes are summarized in the table below.

TABLE 6

|  | Retort Process # 1 221° F. | Retort Process # 2 251° F. |
|---|---|---|
| Containers (sealed with film or foil) | 1.6 ounce Plastic Cups | 1.6 ounce Plastic Cups |
| Food Product | Brineless Black Acidified Medium Pitted Olives |  |
| Maximum Allowable pH | Less than 4.3 |  |
| Maximum Fill Weight | 1.8 ounces |  |
| Minimum Product Initial Temperature | 34° F. | 40° F. |
| Minimum Come Up Time | 36 minutes | 36 minutes to 250° F. |
| Minimum Cook Time | 20.2 minutes |  |
| Minimum Cook Temperature F (16/200) | 220° F. 10 minutes |  |
| Minimum Water Flow Rate During Come Up and Sterilizing Cycles | none | 390 gpm |
| Pressure | 18-19 psi | approx. 30-35 psi |

Example 10

Methods for Producing Flavor-Infused California Style Black Ripe Olives

Below is a table providing detailed recipes for infusing flavors into olives, which can optionally be used with the invention. These ingredients were incorporated into the acidification brining step base brine, and thus were exposed to the olive for the same length of time that the olives were exposed to the acidification reagents.

TABLE 7

| Pizza | Nacho Cheese | Red Bell Pepper | Italian Herb | Bread and Butter |
|---|---|---|---|---|
| Tomato Paste; Sugar; Tomato Powder; Garlic Powder; Onion Powder; Citric Acid; Basil; Oregano; Parmesan Cheese; Pizza Flavor; Pizza Seasoning; Pizza Sauce Flavor; Crust Flavor; Red Color. | Velveeta; Salt; Whey Protein; Onion Powder; Garlic Powder; Nacho Cheese Powder; Nacho Flavor System; Cheese Powder; Tomato Powder; Maltodextrin. | Pepper Puree; Pepper Powder; Red Color; Fresh Bell Pepper Flavor; Sweet Bell Pepper Flavor; | Water Lactic Acid Vinegar Garlic Shallot Basil Salt | Unseasoned Rice Vinegar; Cider Vinegar; Granulated Sugar; Kosher Salt; Mustard Seed; Ground Turmeric. |

Below is a table providing detailed description of the Italian Herb infused flavoring recipe as listed above.

TABLE 8

| Italian Herb Infusion Ingredients (in the Acidification Brine) | Supplier | Code | Percent | Batch (g) |
|---|---|---|---|---|
| Water |  |  | 84.50 | 719.94 |
| Lactic Acid, Liquid | Purac | 88 | 0.60 | 5.11 |
| Salt | Diamond Crystal | Granulated | 3.70 | 31.52 |
| White Distilled Vinegar |  |  | various |  |
| Chopped/Minced Garlic IQF |  |  | various |  |
| Shallot IQF |  |  | various |  |
| Basil, IQF, Medium Cut |  |  | various |  |

Example 11

Pizza Flavored Stuffing

A pizza flavored stuffing paste was created for stuffing black-ripe olives sing the stuffing methods of the invention. The recipe for the pizza stuffing is shown in TABLE 9 below.

TABLE 9

| Pizza Stuffing |
|---|
| Water |
| Tomato Paste |
| Sugar |
| Tomato Powder |
| Alginate/Guar Blend |
| Garlic Powder |
| Onion Powder |
| Citric Acid |
| Basil, ground |
| Oregano, Mediterranean, ground |
| Parmesan Cheese Pwd |
| Cheese Pizza Type Flv Nat. |
| Cheese Pizza Seasoning Flv. Nat. |
| Pizza Sauce Nat Type Flv |
| Crust Type Flv. Nat |
| Red Color FD & C Red 40 Alum Lake |

Non-acidified black-ripe olives were stuffed using the viscous paste formed from the recipe above, using three methods, which were the pre-stuffing solidification insertion, laboratory scale and large production scale direct injection post-stuffing solidification. Each of these methods was used successfully with the pizza flavored stuffing.

When using the post-stuffing solidification method, the stuffing was solidified using a two step calcium chloride soaking protocol. The injected olives were initially soaked in a 5-10% calcium chloride bath for approximately one to five minutes, followed by a more dilute calcium bath concurrent with the acidification brining step (i.e., the acidification brine solution also contained diluted calcium chloride). The stuffed olives were exposed to the low calcium acidification bath for 12-24 hours. Also present in the acidification brining solution were flavor infusion ingredients that would complement and strengthen the pizza-flavors in the solidified stuffing. This acidification/calcium and flavor infusion bath had the following components:

| Acidification Brining, low calcium chloride and pizza flavor infusion solution |
| --- |
| Water |
| Sugar |
| calcium chloride |
| Lactic Acid Solution, 0.80% |
| Natural Tomato Type Flavor ** |
| Aquaresin Onion ** |
| Aquaresin Garlic ** |
| Aquaresin Basil ** |
| Aquaresin Oregano ** |
| calcium chloride (low concentration) |

** = a flavor infusion ingredient

Example 12

Sweet Pepper Flavored Stuffing

A sweet bell pepper flavored stuffing was created for stuffing black-ripe olives. The recipe for the stuffing is provided in TABLE 11 below. Non-acidified black-ripe olives were stuffed using the viscous paste formed from the recipe below.

TABLE 11

| Red Bell Pepper (i.e., Sweet Pepper) Stuffing |
| --- |
| Water, 95° F. |
| Roasted Red Bell Pepper Puree |
| Roasted Red Bell Pepper Powder |
| Natural Red Color |
| Sweet Red Bell Pepper Flavor, Nat., DB |
| Fresh Sweet Red Bell Pepper Flv Nat. |
| Alginate/Guar Blend |

While the foregoing invention has been described in some detail for purposes of clarity and understanding, it will be clear to one skilled in the art from a reading of this disclosure that various changes in form and detail can be made without departing from the true scope of the invention. It is to be understood that the invention is not limited to any of the specifically recited methodologies or materials such as reagents, plant varietals or biological systems recited herein. Similar or equivalent methodologies or materials can be used in the construction and practice of the present invention, and remain within the scope of the invention. It is also to be understood that the description and terminology used herein is for the purpose of describing particular embodiments of the invention only, and is not intended that the invention be limited solely to the embodiments described herein.

As used in this specification and the appended claims, singular forms such as "a", "an" and "the" include plural referents unless the content clearly dictates otherwise. For example, reference to "an olive" or "a container" also includes a plurality of olives or containers. All industry and technical terms used herein have the same meaning as commonly understood by one of ordinary skill in the art or industry to which the invention pertains, unless defined otherwise.

All publications, patents, patent applications, and/or other documents cited in this application are incorporated by reference in their entirety for all purposes to the same extent as if each individual publication, patent, patent application, and/or other document were individually indicated to be incorporated by reference for all purposes.

What is claimed is:

1. A method for producing a packaged, acidified and substantially liquid-free olive preparation, the method comprising:
   (a) providing:
       (i) a plurality of olives, and
       (ii) a container substantially impervious to oxygen when sealed;
   (b) treating said olives with an alkali, thereby producing olives whose fruit is alkaline;
   (c) acidifying said olives by exposure to an acid selected from the group consisting of lactic acid, gluco-delta-lactone (GDL), citric acid, malic acid, adipic acid, or any combination of two or more of said acids, thereby producing acidified, blackened olives having a pH of not more than about pH 4.6;
   (d) packaging said acidified olives in the absence of any free liquid, where the packaging comprises:
       (i) distributing said acidified olives into said container, and
       (ii) sealing said container; and
   (e) treating the sealed container by retort processing utilizing a processing temperature of about 221° F. and a maximal pressure of 18-19 p.s.i. above atmospheric pressure to produce a packaged olive preparation that has a shelf life of about 12 months.

2. The method of claim 1, further comprising, following step (b) and prior to step (c), reducing the pH of said alkali-treated olives to within a range of about pH 8.6 to pH 8.9; and blackening said reduced-pH-olives by treating them with a ferrous oxidizing agent.

3. The method of claim 1, wherein the sealing of said container of step (d)(ii) is under conditions that produce a reduced oxygen environment within the sealed container.

4. The method of claim 1, wherein the sealing of said container of step (d)(ii) comprises pulling a vacuum and flushing with nitrogen.

5. A method for producing a packaged, acidified and substantially liquid-free olive preparation, the method comprising:
   (a) providing:
       (i) a plurality of olives, and
       (ii) a container substantially impervious to oxygen when sealed;
   (b) acidifying said olives by exposing said olives to at least one acid, thereby producing acidified olives having a pH of not more than about pH 4.6;
   (c) packaging said acidified olives in the absence of any free liquid, where packaging comprises:
       (i) distributing said acidified olives into said container, and
       (ii) sealing said container; and
   (d) treating the sealed container by retort processing to a temperature of about 221° F. and a maximal pressure of 18-19 p.s.i. above atmospheric pressure, thereby producing an olive preparation having a shelf life of about 12 months.

6. The method of claim 5, wherein the plurality of olives comprises olives selected from (i) California black ripe olives or olive segments and (ii) California style green olives or olive segments.

7. The method of claim 5, wherein the plurality of olives comprises unpitted olives.

8. The method of claim 5, wherein the plurality of olives comprises pitted olives.

9. The method of claim 5, wherein the plurality of olives comprises pitted olives having a pit cavity and further comprising a stuffing contained within the pit cavity.

10. The method of claim 5, wherein the preparation further comprises one or more additional non-olive food item.

11. The method of claim 5, wherein exposing said olives to at least one acid further comprises exposing said olives to a flavoring infusion.

12. The method of claim 5, wherein said distributing acidified olives comprises distributing acidified olives having an oil coating on the surface of the olives.

13. The method of claim 5, wherein sealing said container comprises sealing under conditions that produce a reduced oxygen environment within the sealed container.

14. The method of claim 5, wherein sealing said container comprises pulling a vacuum and flushing with nitrogen.

* * * * *